Jan. 18, 1966    O. F. MARVIN    3,230,071
RECOVERY OF METAL VALUES FROM COMPLEX ORES
Filed May 25, 1962    5 Sheets-Sheet 1

INVENTOR.
ORRIN F. MARVIN
BY
[signature] John J. McLaughlin
ATTORNEY

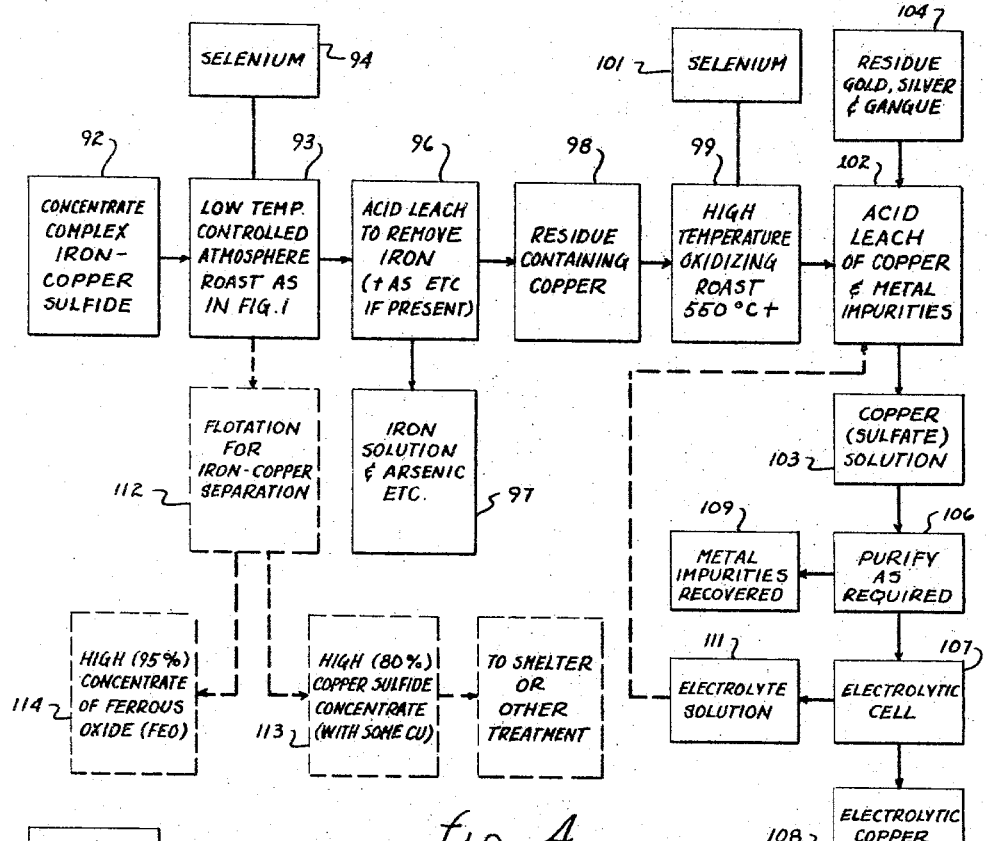

United States Patent Office 3,230,071
Patented Jan. 18, 1966

3,230,071
RECOVERY OF METAL VALUES FROM COMPLEX ORES
Orrin F. Marvin, P.O. Box 1035, Cottonwood, Ariz.
Filed May 25, 1962, Ser. No. 197,703
8 Claims. (Cl. 75—2)

My invention relates in general to the recovery of metal values from complex ores. It relates more in particular to improvements in recovery methods as heretofore known by means of which the complex minerals of the ore may be broken and the ore becomes available for treatment by substantially any known chemical and/or metallurgical method to obtain much better recoveries of the total metal values at substantially much less cost.

In my prior Patent No. 2,927,017 I disclosed a method for recovering metal values from complex ores, particularly complex ores including substantial amounts of iron, copper, zinc and lead sulfide. Such patented process is characterized by a relatively low temperature roast to solubilize some of the metal values without forming undesirable ferrites and antimoniates and the like which will have a deleterious effect on subsequent recoveries, leaching soluble metal values, then heating at a high temperature to solubilize the remaining metal values, leaching the same, and finally treating the solutions by hydrometallurgical methods to recover substantially all of the metal values.

In my co-pending application S.N. 10,210, filed February 23, 1960, I disclosed a new process wherein the first low temperature roast was then subjected to a reducing roast after which substantially all of the iron but none of the copper was solubilized, leaching the roasted concentrate to remove iron, roasting the residue at a higher temperature, and then leaching out all of the remaining metal values and then recovering the same by chemical and/or hydrometallurgical means.

In accordance with each of my prior inventions identified hereinabove, there is a partial breakdown of the complex such that metal recovery is markedly improved, as contrasted with other available methods. One of the limitations of such methods, however, is the fact that the recoveries associated with the roasting step or steps are limited in that, at least to some extent, and particularly with respect to the removal of iron, hydrometallurgical methods are employed; and while there is no objection to removal of iron by leaching, and in fact certain definite advantages are obtainable thereby, an over-all process may indicate a preferable step at this point and the process as a whole shows definitely that there are some limitations in the re-arrangement of the chemical and/or crystalline bonds characteristic of complex ores.

There is still another aspect of my prior inventions, and that is that they are primarily directed to and have their greatest utility under circumstances when several metals are present in fair concentrations. Most characteristic of this kind of condition is the type of ore in which there is a substantial amount of iron, copper, zinc and lead sulfide with smaller proportions and traces of possibly several other metals including rare metals, silver and gold. But complex ores are by no means limited to the well-known iron-copper-zinc-lead sulfide combinations characteristic of many Western State deposits. Even the relatively simple iron-copper sulfides, of which chalcopyrite is illustrative, and which are mined extensively for their copper content, are actually complex ores.

Many deposits of complex sulfide ores are worked and at least some of the metal values extracted therefrom on a marginal commercial economic basis. Some complex ores are so difficult to handle that considering the recoveries and the cost thereof they are economically unworkable under present conditions. In general, even in the case of relatively simple complexes such as chalcopyrite, there is a complete failure to obtain all of the metal values and frequently the costs are far out of line with what they should be from an economic standpoint.

The principal object of my present invention is the provision of a new method of and means for treating complex ores.

Another object is to treat a complex ore in such a manner as to break the complex so that the ore or concentrate may then be treated in accordance with any one of many different chemical and metallurgical processes.

Another object is to recover all of the metal values from complex ore including substantially all precious metals and rare metals present in an over-all process which does not require selective mining or selective concentration at any time.

Another object is to recover all of the metal values from a complex ore by a physical-chemical mechanism which permits production of a bulk concentrate of the ore as one step in its treatment in which bulk concentrate all of the metal values may be found.

Another object is the provision of highly concentrated specific metal concentrates from complex ores without leaving appreciable metal values in tailings.

Another object is the provision of means for the direct electrolytic recovery of metals such as copper from iron-copper sulfides without the interposition of a smelting procedure now commonly used in substantially all copper recovery methods.

A further object is to concomitantly secure substantially all of the metal values from complex ores and reduce both the processing costs and capital investment cost normally associated with such recoveries.

Other specific objects and features of the invention will be apparent from the following detailed description taken with the accompanying drawings, wherein:

FIG. 1 is a schematic view showing a significant step in the process of the present invention wherein the ore and preferably a bulk concentrate of the ore is subjected to a relatively low temperature roast under controlled atmosphere conditions in such a manner as to break the complex comprising the ore and make it available for subsequent processing in accordance with substantially any known chemical and/or metallurgical procedure, or combinations thereof for the recovery of substantially all of the metal values, including values of precious metals and rare metals;

Figure 1:
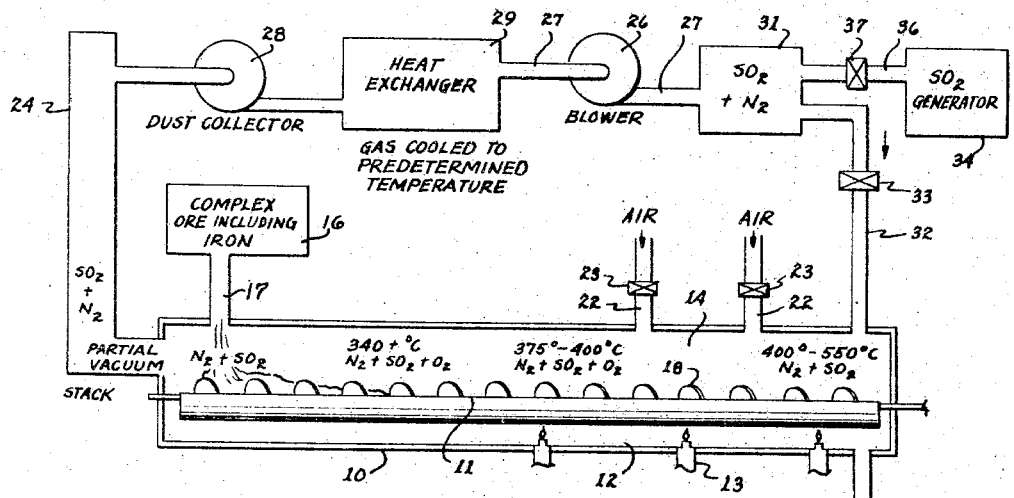
Figure 2:
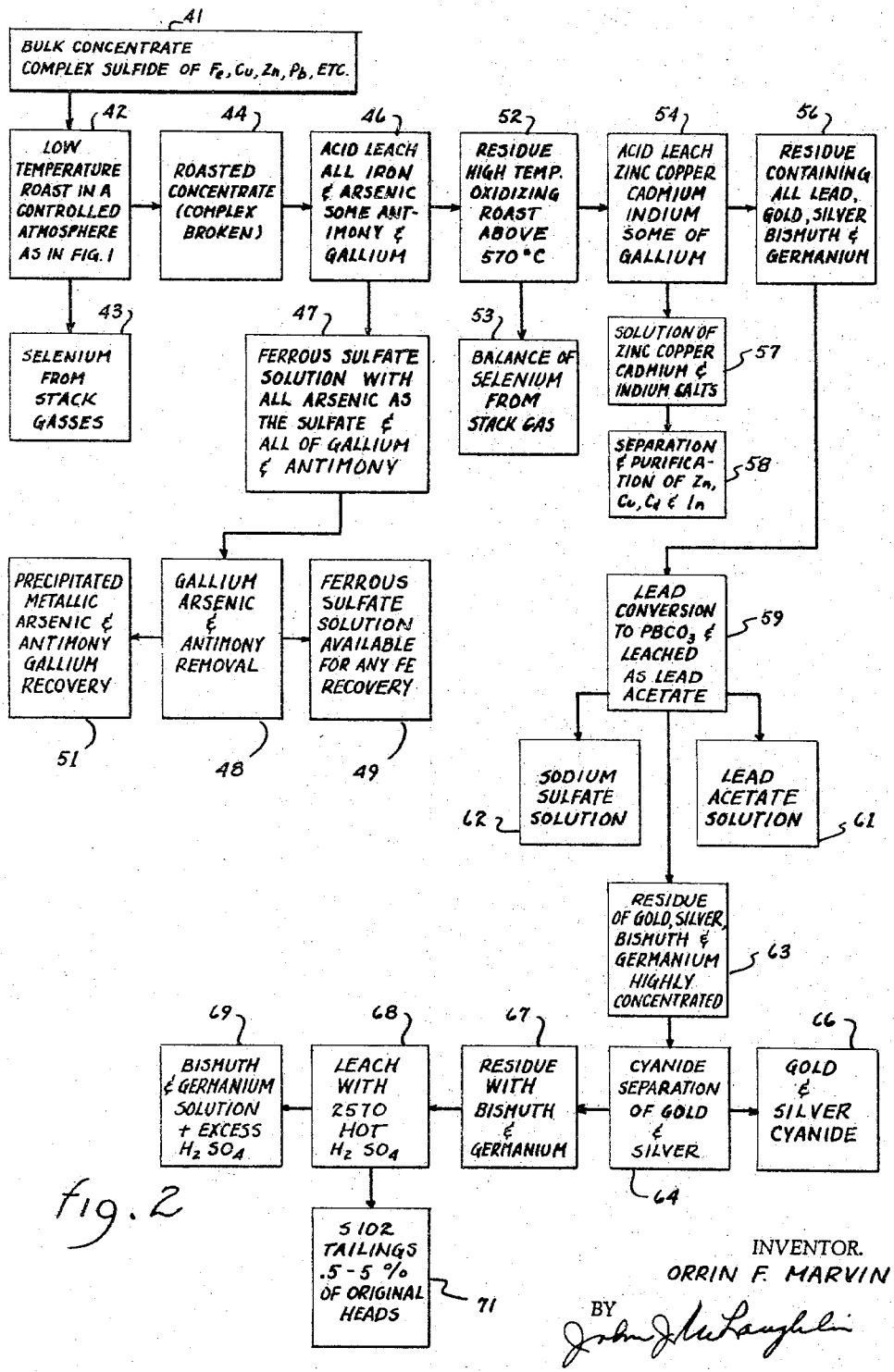
FIG. 2 is an illustrative flow sheet showing one manner in which a complex ore containing iron, copper, zinc and lead can be treated in accordance with the present invention for the hydrometallurgical recovery of all of the metal values therefrom.
Figure 6:
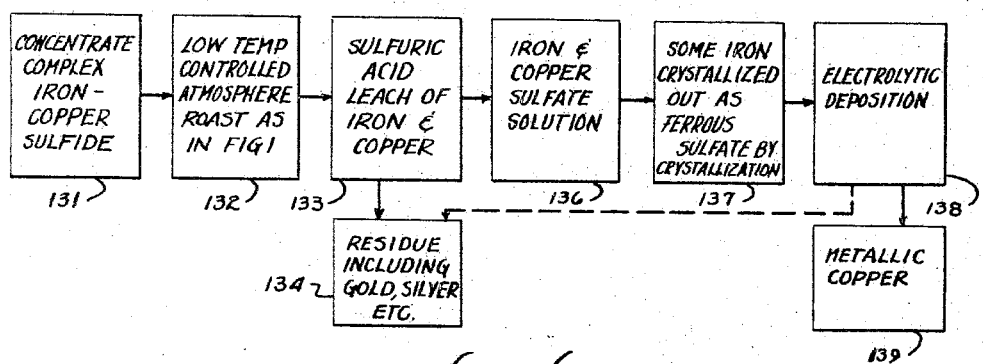
Figure 7:
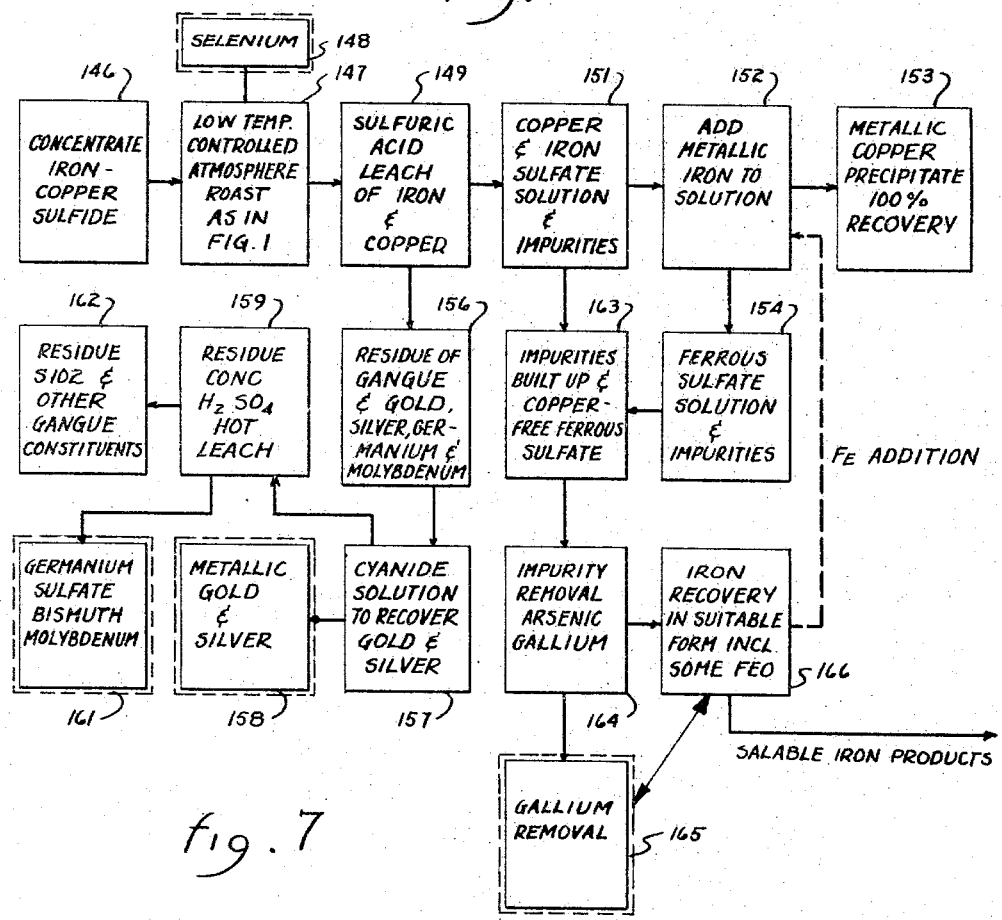
Figure 8:
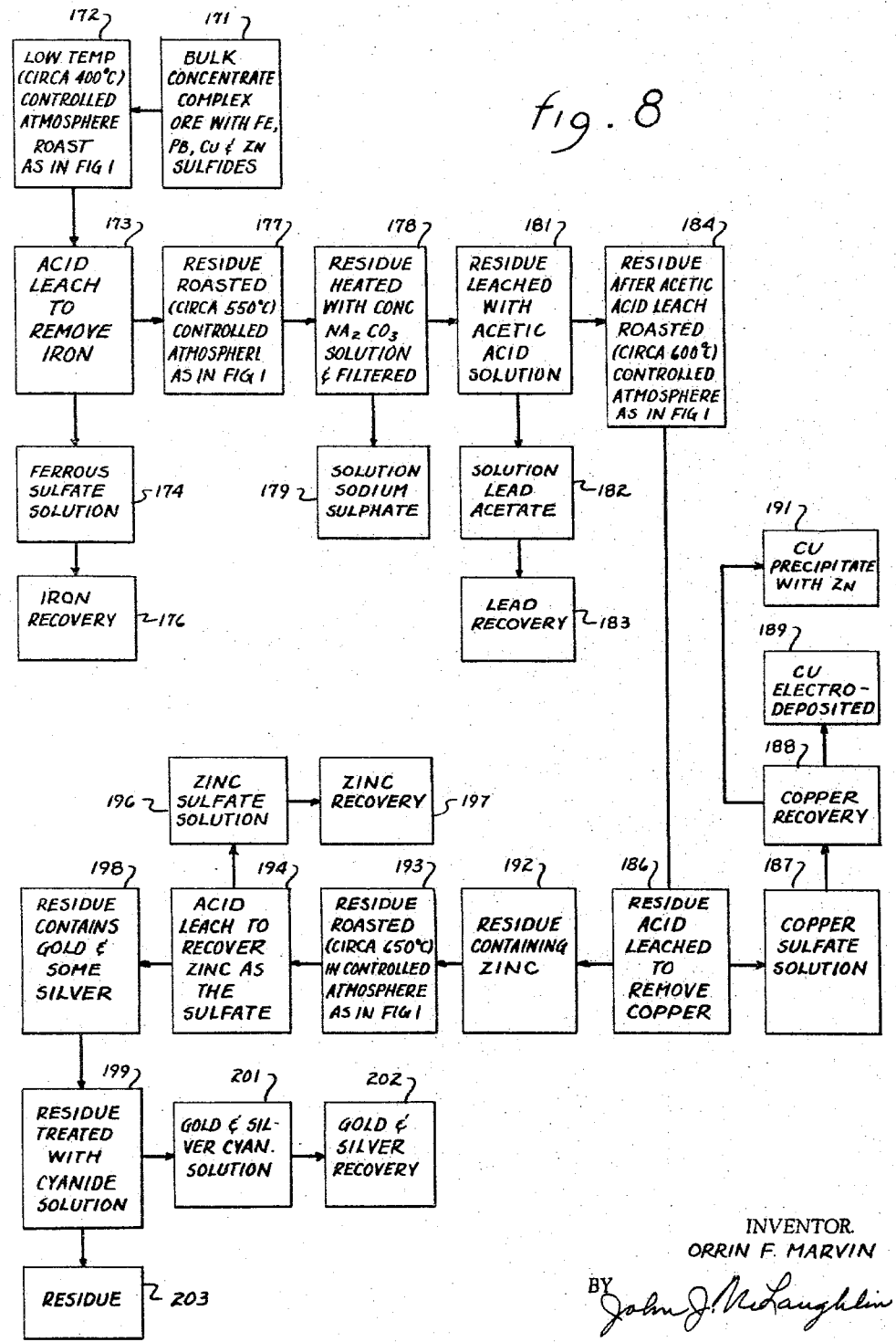

FIG. 4 shows one manner of treating a bulk concentrate of a complex ore comprising essentially iron copper sulfide wherein a copper sulfate solution is formed and such solution delivered to an electrolytic cell for electro recovery of the copper values, the flow sheet also showing a modification in which a very high concentrate of copper sulfide may be prepared for delivery to a conventional copper smelter;

FIG. 5 shows still another flow sheet for the treatment of a concentrate of a complex ore comprising essentially an iron copper sulfide system;

FIGS. 6 and 7 are still additional flow sheets indicating other methods of treating bulk concentrates of complex ores comprising essentially iron copper sulfides, and FIG. 8 shows still another flow sheet for the hydrometallurgical recovery of substantially all of the metal values from a complex ore comprising essentially an iron-lead-zinc sulfide, the process in FIG. 8 utilizing a controlled atmosphere roast of the general type characterizing that shown in FIG. 1 for the individual recovery of substantially all of each of the principal metal constituents of the ore instead of solubilizing substantially all of the metal sulfides remaining after extraction of iron as illustrated in FIG. 2.

In accordance with the general features of my invention I first prepare a bulk concentrate of the ore to be treated, mining the ore as it comes without leaving unmined ores containing difficultly removed impurities, such as is a common practice in the pyrometallurgical treatment of complex ores comprising essentially iron-copper sulfides. While preferably I utilize a bulk concentrate to be assured that all of the metal values in the ore and in various pockets of the ore will be recovered, I may treat substantially any fraction of a complex ore in accordance with my invention and beneficially recover metal values which are not now normally recovered in commercial practice. Illustratively, concentrates of iron-copper sulfide prepared for smelting will frequently leave some of the metal values in the mine or in the tailings, but I can treat such a concentrate in accordance with my present invention and obtain a better recovery of the metal values at less cost than is possible in accordance with conventional smelter operations. As a further illustration, I may, for example, treat a so-called selectively floated concentrate sold commercially as either a zinc concentrate, a lead concentrate, or a copper concentrate, and recover metal values from the ore in greater percentages and at less cost than are usually possible with present methods. When in the explanation hereinbelow, therefore, and in the examples given, reference is made to a bulk concentrate, this is intended to represent the most desirable procedure, but it should be borne in mind that concentrates representing something other than all of the metal values in the ore can also be treated in accordance with any of the processes of the present invention.

In accordance with the general features of the invention I first heat the ore or a concentrate of the ore at a temperature between about 370° C. to about 600° C., but preferably between about 400° C. and 550° C., in an atmosphere comprising a minor proportion of air and a major proportion of an inert gas preferably including $SO_2$, as will be explained, for a period of from about three quarters of an hour to about one and one-half hours, or until the iron content of the ore is soluble in dilute sulfuric acid, the roasted product so produced then being characterized by the fact that the physical and/or chemical complex which characterizes the mineral comprising the ore is now broken and the metal values can as a rule then be separated by any of several known methods including leaching, flotation, and other known procedures.

Before referring more in detail to the parameters of the controlled atmosphere roast, the schematic illustration of equipment and method shown in FIG. 1 will first be discussed. The data shown in FIG. 1 is based on a pilot plant unit through which approximately a ton a day of ore may be processed, the exact amount processed depending upon several factors including the percentage of iron in the ore being treated, the temperature, the furnace atmosphere, the specific roasted end product desired, etc.

In FIG. 1 I show a long furnace 10 which for all practical purposes is sealed except for passageways to be described for the admission of gases thereto, the removal of gases, the introduction of the ore to be roasted (the term "ore" is used to include either the ore itself or any kind of a concentrate thereof). A bed 11 which may comprise a strip of stainless steel in the general form of a shallow trough separates the furnace into two parts, a lower part 12 containing preliminary heating elements 13 and an upper portion 14 containing the ore and the furnace atmosphere in contact with the ore. The ore is delivered from a bin 16 suitably sealed to prevent entrance of air through a conveyor 17 which delivers the ore in a continuous controlled quantity stream. In the drawings 17 is shown merely as a chute, it being understood that any one of several different types of feed mechanism such as a screw conveyor may be employed.

The ore is delivered to the bed 11 and is then continuously and slowly advanced along the bed by a screw conveyor 18. Preferably this is a series of overlapping paddles rather than a continuous screw, so that as the ore is advanced it is also turned over and fresh surfaces continuously presented into contact with the atmosphere. The roasted ore is discharged at the right hand side of the furnace, looking at FIG. 1, through a cooling and sealing chamber 19 and thence to a sealed receiving bin 21, the roasted ore thereby being kept out of contact with atmospheric air while it is in a heated condition.

Oxidizing air is delivered to the furnace at at least one location between its ends, as indicated by the two air inlets 22 each of which is controlled by a valve 23. The number, location, disposition and controlled size of the ports for admitting the air are determined by a number of factors, as will be apparent, including the amount of inert gas introduced, the proportion of inert gas to air desired and required, the proportion of metal such as iron to be solubilized at a given treatment step, and other factors.

The hot gases from the furnace are discharged through a stack 24 which runs to any suitable location as determined by an over-all design, but in accordance with the present invention optionally to a sulfuric acid plant for the production of sulfuric acid usable in subsequent steps of the process. The stack gases from equipment such as shown in FIG. 1 are particularly suitable for the production of sulfuric acid because all of the arsenic in the ore is removed with the iron and practically none of it is driven off during the first heating step. As a consequence, there is no arsenic to poison a catalyst as frequently occurs in sulfuric acid plants where the sulfur dioxide results from high temperature treatment of ore bodies or fractions thereof.

A blower 26 withdraws stack gases from the stack 24 through a pipe 27, the stack gases first going through a dust collector 28, thence through a heat exchanger 29 where the gas is cooled to a pre-determined temperature usually about room temperature or somewhat below, and thence delivered to or through a reservoir 31 and through an inlet pipe 32 in controlled amount to the discharge end of the furnace. The flow of cooled and cleaned products of combustion to the reaction zone may be controlled in various ways, and to indicate the control I show a conventional valve 33. For starting the operation sulfur dioxide may be produced in a generator 34 and delivered through a pipe 36 and valve 37 to the container 31.

The temperatures and broadly indicated atmospheric conditions are typical of the first step in the treatment of a complex ore containing substantial amounts of iron sulfide when the purpose of the first step is to solubilize all of the iron and break the sulfide complex. The conditions indicated are representative and may vary, particularly if the FIG. 1 equipment is used to solubilize other metals, as discussed later on in the present specification. It will be noted that at each end of the furnace the furnace atmosphere consists essentially of only nitrogen and sulfur dioxide and that in the center portion of the furnace there is a mixture of nitrogen, sulfur dioxide and oxygen, it being obvious that in general the oxygen content is apt to be somewhat higher in the immediate area where the air is introduced than further to the left thereof when there has already been some reaction between the oxygen and ore. The temperatures given are for the ore rather than for the hot gases above the ore. The ore enters generally at about room temperature and gradually increases as it moves toward the discharge end of the furnace.

It will be noted that a temperature as high as 550° C. may be present at the extreme end of the furnace toward the discharge end, and that normally a temperature of this magnitude will tend to produce some insoluble ferrites and some ferritic iron, particularly when the ratio of air to inert gases is not of an extremely low order. One of the peculiarities with respect to the present process is that with the controlled atmosphere, particularly with substantial proportions of $SO_2$ in the atmosphere, all of the iron in the roasted product is found to be ferrous iron and there is no production of ferric iron.

As will be pointed out, the sulfur dioxide does not appear to act as a reducing agent, and the amount of $SO_3$ in the stack gases clearly indicates that the mechanism involved is not one in which ferric iron is first produced and the ferric iron then reduced by means of sulfur dioxide. There is something in the physical chemical equilibrium involved of which I am not fully aware which causes the production of ferrous oxide to be complete, and widens the temperature range at which ferrous oxide can be produced, particularly in the direction of raising the temperature above that normally possible in this type of operation and as disclosed in my prior patent and co-pending application.

Before describing the various examples of the invention as shown in the flow sheets in detail, it may be helpful to consider the processing of the present invention from a general standpoint.

I have already referred to the fact that in a single step all of the iron in the roasted product is in the ferrous condition, all of it apparently being present as ferrous oxide (FeO). The ferrous iron may be leached and recovered in the form of a salable product in accordance with several different procedures. Arsenic present in the ore is found in the resulting ferrous sulfate solution apparently as an iron arsenite, and it may be completely removed by adding metallic iron in the form of very fine particles, the arsenic then being precipitated as elemental arsenic.

A very important feature is that gallium which is present in fair amounts in many ores, but generally not recovered at all, is leached out with the iron and is completely recoverable.

Most significantly, the first step in accordance with FIG. 1 breaks the complex so that the various metal values can be separated in accordance with many different schemes including flotation. While the iron is preferably removed by leaching, it also can be concentrated and a fine separation produced by flotation means.

Still another feature of the method, particularly including the controlled atmosphere roast, is that precious metals and particularly rare metals can be recovered with substantially no loss. They are recovered in various ways as will be pointed out, but at this time it may merely be pointed out that I have been able to extract up to six ounces per ton of selenium from the bulk concentrate of an ore that is now being processed commercially and no selenium recovered therefrom. Many complex ores contain traces of germanium, selenium, gallium, and other rare metals which are in short supply in the market, and I have found it possible to recover substantially all of these metals when they are present in only trace amounts when by present processes such metals are for all practical purposes lost. Illustratively, when rare metals are present in small amounts in concentrates fed to copper smelters, the rare metals are either slagged off with the iron silicate slag or with the slag from the reverberatory furnace, or they may be driven off with effluent gases and lost to the atmosphere. More than a certain amount of certain rare metals cannot be tolerated. For example, if selenium is present in fairly substantial amounts as an impurity in chalcopyrite and a concentrate produced containing the selenium, a selenium-copper alloy will be formed during the smelting procedure and thereafter it will be a physical impossibility to extract the selenium from such copper. Such copper is then for all practical purposes non-usable, and there is more than one smelter in this country which has a pile of pigs of blister copper containing selenium which in the present stage of technology cannot be purified and which represents a dead loss.

Another feature of the present invention is that I may take a complex ore, treat it to "break" the complex, and then by selective flotation produce very much higher grade concentrates than can be produced by previously known methods, and the concentrate so produced may be sold as such to commercial companies at a good price because of the mineral content and without penalty of the type charged when the concentrate includes more than a fixed amount of undesired elements. The concentrate so sold may then be further treated by, for example, conventional smelting procedures, by means of electrodeposition, or any of the several usual procedures common to chemical and metallurgical operations. When the concentrates are treated by smelting operations, there will be some loss of precious metals and usually a complete loss of rare metals subjected to the smelting operation with the concentrate. In the preliminary roasting step, however, prior to the production of the concentrates, I may recover certain of the rare metals. For example, a substantial proportion of the selenium present vaporizes and passes to the stack with the effluent gases, and the selenium so vaporized is readily recovered by simple precipitation methods.

In the specification and particularly in the claims I refer to the treatment of complex ores or complex sulfide ores, and it is in point to explain at this time that by a complex ore I mean one in which the metal constituents are complexed in the mineral with sulfide radicals in such a way that the metals cannot be separated by usual means, particularly means involving physical manipulation such as tabling, flotation, sink-float, and other such mechanisms. These ores are in general sulfide ores, but they may have a small inclusion of oxides, carbonates and the like resulting from partial weathering of the sulfide. When I employ the term "ore" it is in a generic sense unless the context indicates otherwise, and includes any fraction of the ore whether concentrated or unconcentrated and whether involving a selected concentrate or bulk concentrate. I wish to note also that while the term "complex ore" is sometimes used in a limiting sense to identify complex sulfide containing several metals, I employ the term, except as indicated by the text, to include such simple complex sulfides as iron-copper sulfide, such as present in the mineral chalcopyrite.

Another feature of the present invention is that the amount and complexity of the equipment required to recover metal values from complex ores is greatly reduced. I may, for example, deliver an ore or concentrate to the reaction zone in the step of the process indicated in FIG. 1 with particle sizes up to one-quarter of an inch, although to produce even a bulk concentrate it is usually necessary to comminute the ore to a point below this size. In any case, whatever the size of the concentrate delivered to the reaction zone of the controlled atmosphere step, the product is decrepitated and comes out as a very fine powder-like mass. In general, therefore, when operating in accordance with the present invention, crushing and grinding equipment can be reduced by at least about fifty percent and up to seventy-five percent in unusual cases, and the number of flotation cells employed can also at least be cut in half. It should be apparent that when a selective concentrate is produced, the ore must as a rule be ground to about 300 mesh, and there must be several passes through different types of flotation cells before the end product concentrate is produced clean enough for commercial exploitation. This should contrasted with the present invention in which it will very seldom be necessary to grind the ore to less than 10 mesh, and in which the bulk concentrate may be produced with a single battery of flotation cells with no need for loops to specially process certain fractions and as a rule with no need for the use of substantial amounts of expensive frothing and collecting agents. In accordance with the present invention such flotation as may be accomplished after the initial controlled temperature roast to a bulk concentrate requires no additional grinding because of the decrepitation in the roasting step, and as a rule very simple and inexpensive flotation reagents can even be used to produce the desired concentrates.

I have referred to the use of an inert gas or neutral gas to dilute the oxygen in the reaction zone shown in FIG. 1 to thus reduce the rate of oxidation and to remove heat generated by the resulting exothermic reaction by means of such introduced gas. In determining the type and amount of inert gas employed, it should be remembered that the amount of air with its oxygen content required to enter the reaction during the low temperature oxidizing roast cannot be reduced below necessary amounts, but must be calculated in accordance with stoichiometric requirements. When the ore is passed continuously through a reaction zone as shown in FIG. 1, the amount of air introduced is not only a function of the amount of concentrate in the reaction zone, but is also a function of the speed at which the ore passes through the reaction zone. The amount of air required may preferably be calculated on the assumption that a static condition exists, and the air is introduced into a closed reaction chamber in which a fixed amount of concentrate has been placed. The rate of introduction of the inert gas is then established based on the predetermined oxygen and air requirements. The inert gas introduced may be of many types but preferably includes a proportion of sulfur dioxide, all of which will be considered further in a discussion of the functions performed by the diluting inert gas introduced.

The amount of inert gas introduced may vary extensively depending upon a number of factors including the character of the ore itself, and particularly the iron content of the ore when the function of the first step is to solubilize all of the iron present, the temperature of the reaction zone, the time of reaction as measured by the speed at which the ore passes through the roasting furnace, the type of inert gas, particularly the amount of sulfur dioxide included, and other factors. In general, however, there should be a major proportion of inert gas and a minor proportion of air ranging all the way from about one part (plus) of inert gas to one part air, and up to and even in excess of ten parts of inert gas to one part air. In determining the furnace atmosphere it should, of course, be noted that some of the sulfur in the ore is converted to SO₂ so that there is an SO₂ fraction in the furnace atmosphere resulting from the roasting operation. When the relationship of inert gas to air is relatively the same, then the sulfur dioxide generated by the roast becomes a greater factor and this may be further accented by control of the furnace atmosphere to retain effluent gases for a longer than usual time before discharge through the stack.

As pointed out the introduction of inert gases into the furnace, and particularly the introduction of cooled stack gases into the furnace in accordance with the preferred embodiment of the present invention, performs several functions.

The first and one of the very important functions of the added inert gas at room temperature is a scavenging operation in a sense, but has to do not only with the removal of the heat of reaction so that the temperature of the ore may be held down to a desired point such, for example, as between 400° C. and 550° C. in the highest temperature part of the reaction zone. If the mechanism shown in FIG. 1 were operated without the addition of cooled stack gases, for example, the temperature would gradually rise to a point where undesirable insoluble and insolubilizing compounds were produced. One approach in solving the rising temperature problem would be to greatly restrict the amount of air admitted over a given period of time and, of course, it would also be necessary to greatly restrict the speed of movement of the ore through the reaction zone. Such a method might require twenty-four or forty-eight hours or still more to produce the necessary low temperature oxidation, as contrasted with, for example, one hour under circumstances illustrated in FIG. 1.

The second function of the added inert gas is the dilution of the oxygen in the furnace atmosphere, and the reduction of the actual amount of oxygen in the atmosphere flowing across the top of the ore. This results in part in reducing the rate of oxidation, but it should be noted that the rate of oxidation is more properly a function of ambient heat rather than oxygen dilution, keeping in mind as previously pointed out that there must be enough oxygen present over a period of time to accomplish the degree of oxidation desired, and this amount of oxidation would still occur rapidly regardless of dilution if the furnace temperature were allowed to rise. So far as the dilution of the oxygen is concerned, the inert gas might, for example, be free of SO₂ and could, for example, be nitrogen. Excess nitrogen might also be introduced, of course, by partial combustion of the oxygen in the air delivered to the reaction zone, but in general this particular approach to dilution of the oxygen is not recommended because of the economics involved and for several reasons.

The third function of the introduction of an inert gas is concerned primarily with the sulfur dioxide content of the furnace atmosphere, and in consideration of this function it is apparent that an ordinary inert gas without a sulfur dioxide content would not produce this particular function. I have observed that while the sulfur dioxide apparently does not enter the reaction in any way as a reducing agent, its concentration has an apparent direct effect in preventing the formation of ferric iron which normally cannot be reduced at a temperature below about 600° C., in breaking the complex, in permitting increased temperatures, and widening the temperature range of a desired reaction, and solubilizing one constituent of the ore such as the iron without solubilizing other constituents. All of the above, of course, is subject to proper control, but the results are apparently not obtainable except with a substantial proportion of sulfur dioxide in the furnace atmosphere, such as obtained by the re-circulation of stack gases, the cooling of such stack gases, and the introduction of the resulting cool stack gases into the furnace atmosphere at the ore discharge end of the reaction zone.

A fourth function is that the inert gas when containing a fraction of sulfur dioxide almost acts like a catalyst in making the controlled atmosphere roasting step more selective in that it permits confining initial decomposition of the sulfide to a selected metal such as iron. This function was touched on hereinabove, but by the presence of the sulfur dioxide the decomposition of the iron sulfide—and, of course, the concomitant breaking of the sulfide complex—may be carried out at a higher than normal temperature (such as disclosed in my prior patent and prior pending application) and over a wider range than heretofore possible while still confining the solubilizing to the single metal or, in some cases, a group of metals as pre-determined.

Another direct contributing function of the sulfur dioxide in which it does not act as a reducing agent nor apparently technically as a catalyst, but with some apparent function like a catalyst, is the complete breaking of the complex comprising the mixture of metallic sulfides. As I have pointed out, when iron is converted to FeO and the sulfur equivalent in the iron removed, the remaining base metals appear then to be in the form of simple sulfides exemplified by CuS, Cu$_2$S, PbS, ZnS, CdS, etc., all of which are then readily separable by several standard metallurgical and/or physical chemical procedures. My two prior inventions accomplish a partial breaking of the sulfide complex, but by no means as complete or direct a breaking of the complex as in the present invention. It should be noted that the breaking of the complex is a separate phenomenon from the conversion of the iron sulfide to FeO, although so far as I can now determine substantially concomitant therewith. I have reason to believe from certain observations that with suitable controls it may be possible to break the complex without converting the iron, or at least all of it, to FeO if there should be any reason for doing so, and, therefore, I do not limit myself to specific conditions for iron removal as exemplified in the present specification.

Another apparent function of the controlled atmosphere roast, which may or may not be directly associated with the SO$_2$ content of the furnace atmosphere, is that the first roast and iron leach appear to pre-condition or activate the residue remaining after the iron leach for a later high temperature or the like roast in that the normal high temperature roast can then be carried out at a lower temperature than normally required and/or for a shorter period of time.

Still another function or feature of the controlled atmosphere roast is the ability to separately solubilize various constituents of the complex ore for separate leaching operations if this manner of treatment should be required for any particular reason. For example, after the iron has been removed I may then take the residue from the iron removal end and again pass it through the reaction zone, as shown in FIG. 1, keeping the conditions discussed standard except for raising the temperature some, illustratively to 550° C. The residue can then be treated to remove the lead hydrometallurgically, as, for example, by first treating the residue with sodium carbonate to form lead carbonate, and then leaching the lead carbonate with acetic acid. In any event, after the removal of the lead the residue can then again be run through the controlled atmosphere roasting procedure at a temperature somewhat higher, illustratively about 600° C., and the copper selectively solubilized. After the leaching of the copper, the residue can again be treated by the controlled atmosphere roast at, for example, above about 650° C. and the zinc then removed by leaching. Illustratively also as will be pointed out, two or more of the metal constituents can frequently be removed in a single roasting leach step if required, either in the first step of the process or in a subsequent step. Illustratively, chalcopyrite may be roasted to solubilize only the iron or, under certain circumstances at least, the roasting conditions can be controlled to solubilize both the iron and copper.

With further respect to the percentage of cooled stack gases re-circulated back to the reaction zone, I have already pointed to some of the variables that have a bearing on this percentage, and I wish to note again that the physical characteristics of the ore being treated and the amount of stirring in the reaction chamber also have a bearing on this percentage, in addition to the previously discussed variables including the temperatures, the time of reaction, and the chemical characteristics of the ore. While some of the examples will illustrate the air/inert gas relationship within the general range of about one to one to one to ten as already discussed, I wish to point out that a common percentage for many types of complex ore is of the order of four, five or six parts of cooled stack gases by volume to each air volume. As an example, a complex ore from northern Arizona containing about twenty percent iron, twenty-five percent zinc, about ten percent lead and about two percent copper required about six parts of cooled stack gases to one part of air for best operating results in a relatively small pilot plant in which the ore passed through the reaction zone in about one hour or slightly more, and in which the total amount of ore treated in the reaction zone for a twenty-four hour period was slightly over one ton. On the other hand, a high zinc ore containing also a fair percentage of both lead and copper but only a trace of iron required only about one part of stack gases to one part of air to solubilize all of the iron and leave the zinc present in the form of a simple sulfide. I have also treated a concentrate comprising essentially iron disulfide to determine the reaction conditions for solubilizing all of the iron therein and, with substantially the same conditions illustrated in FIG. 1, the amount of cooled stack gases re-circulated back to the reaction zone was of the order of ten parts to one of air. The total time in the reaction zone was also increased, the rate of treatment being at about one quarter of a ton per day.

One of the features of my invention is that with a single roasting step I may solubilize all of the iron present in a complex ore and remove this iron in soluble condition in accordance with several different procedures. From the standpoint of iron recovery it must be remembered that in almost all ore treating operations iron is treated as an impurity which must be removed, and it is very seldom that the iron is recoverable as a salable product. When concentrates of lead, zinc or the like are sold to processors a penalty is charged for an iron content over an established figure to thus reduce the net price which the commercial smelter or other processor pays to the producer of the concentrate. As a result, producers of commercial concentrates normally avoid as much iron as possible in their finished products, even at the expense of loss of otherwise valuable metal. The iron removed goes to tailings and, generally speaking, has no commercial value. Concentrates of iron-copper sulfide provided as a feed to copper smelters will run as high as forty parts of iron to twenty parts of copper, and in some instances even the copper in the concentrate is of a still lower value. This necessitates repeatedly charging converters with new charges of matte before it is possible to build up sufficient copper sulfide in the converter to warrant continued operation and Bessemerizing of this material to the usual blister copper. As an example, it is frequently necessary to provide as much as twenty or more charges, "taps" or ladles of copper matte for each finished charge of white metal with, of course, attendant losses of time and increased labor costs. But most significantly, all of the iron in the concentrate must be handled several times in its path from the mine through the smelter, and it ends up on a slag pile in the form of a product consisting essentially of iron silicate and for all practical purposes is completely worthless commercially. Copper smelters have spent many millions of dollars in an effort to develop procedures for salvaging this tremendous mass of iron, but none of this development work has resulted in even a vestige of success.

In the practice of my invention I recover the iron almost as a by-product and almost without any cost directly attributable to iron recovery. Normally the iron is leached as a ferrous sulfate solution, and as a rule represents a pure iron sulfate except for the readily removable arsenic and some small amount of antimony in the particular ore treated. Later the ferrous sulfate may be crystallized out of solution, or the solution dried on commercial drying equipment to recover a commercially valuable hydrated ferrous sulfate having such extensive demand in the agricultural fields that tremendous quantities thereof are imported into this country. Another method of recovering the iron is to heat the ferrous sulfate in a non-oxidizing atmosphere to drive off sulfur as SO$_2$ and with some SO$_3$ to form a product consisting essentially of FeO. The FeO can be the starting point for producing many different types of commercial iron compounds and, of course, it may also be employed as a furnace feed in steel making. Pure FeO, however, may be reduced to metallic iron at red heat by means of dry H$_2$. The finely divided metal is very valuable for many purposes including, for example, precipitation of arsenic from the ferrous sulfate solution, the precipitation of antimony and for the removal of impurities from solutions by means of an oxidation reduction process in which the iron goes into solution and the reduced metal precipitates out. The finely divided iron so produced is very valuable as a replacement for old cans and the like frequently used in the copper industry for replacement of copper in solution as in launders and the like. Still another method which may be used with the ferrous sulfate is to heat it in air at about 600° C. to drive off $SO_3$ which may then be hydrolyzed to form sulfuric acid and to produce from the ferrous sulfate a ferric oxide ($Fe_2O_3$) which also has many uses in agriculture, in the pigment industry, and the like.

While various complex ores have definite similarities even though taken from different locations, it is very seldom that two ore deposits will be absolutely identical. Regardless of detailed instructions which may be given, therefore, with respect to treatment of a given ore, it may be that a closely similar ore will require experimentation and even quite changed conditions for most effective use of my present invention. The present specification including the detailed examples, however, will furnish an ample guide to those skilled in the art for changing the process as required. There may be, however, other considerations not directly related to the present invention, but having a bearing on most effective use of the present invention. It is impossible to give a complete bibliography with respect to this subject matter, and I will attempt only one illustrative situation. Complex sulfide ores frequently have a content of alkali metals or alkaline earth metals, and the presence of either, particularly in relatively large amounts, may have a deleterious effect on the present process. By first washing and leaching the ore or preferably its concentrate by means of dilute sulfuric acid, base constituents such as sodium, potassium, magnesium and the like are readily removed. The first roasting step of the present invention is then more effective. I do not mean to say that without the preliminary treatments with dilute sulfuric acid that it is impossible to operate the present process, but as a rule it will be found that the time of treatment will have to be increased somewhat and the temperature also increased somewhat, if the iron is to be completely solubilized, and, moreover, iron solution will then be contaminated by at least some of the alkali or alkaline earth metals present.

Concerning the re-circulation of sulfur dioxide or the direct introduction of sulfur dioxide from a sulfur dioxide generator, or such other manipulation as may be employed to increase substantially the sulfur dioxide in the atmosphere of the reaction zone. I am aware that physical chemists studying the reaction occurring in copper converters where the temperatures will range from 2000° F. to 2600° F. have attempted to explain the reactions occurring in the molten copper and the equilibrium involved by reference to the partial pressure of sulfur dioxide above the molten copper or copper sulfide mass. There have also been some references, although not so precise, with respect to partial pressure of sulfur dioxide in studies relating to what are frequently called straight sulfate roasting techniques. These techniques involve roasting a material which may, for example, be a sulfide ore at relatively high temperatures, such as 900° C. to as high as 1100 C., for the purpose of converting some of the constituents to oxides or sulfates which can then be leached from the roasted material. In accordance with known sulfate roasting procedures involving high temperatures it is, of course, possible to solubilize some of the materials present, but as a rule recoveries are low and may even be less than sixty percent of the total mineral content. A point I wish to make primarily, however, is that notwithstanding extensive studies with respect to partial pressures of $SO_2$, it appears obvious to me that the mechanism involved and the explanations thereof in copper smelting procedures and sulfate roasting procedures do not account for the unusual results obtainable by my present invention. While it may be that the partial pressure of $SO_2$ may be found to have a bearing on the reactions occurring between the ore on the one hand and the furnace gases on the other and, of course, within the ore itself where there is an obvious re-arrangement of chemical bonds and possible loss of sulfur other than that accounted for by losses from the iron portion of the complex, explanations made heretofore with respect to other reactions do not account for results in the present invention. I am unable to explain the results which I obtain from a technical physical chemical standpoint, except that it appears from the relatively small proportions of $SO_3$ in the stack gases that the action of the $SO_2$ is not explained merely by assuming that it functions as a reducing agent.

*Example 1*

In FIG. 2 I illustrate one general method of practising the present invention assuming the original ore to be a complex sulfide ore containing substantial proportions of iron, copper, zinc and lead with or without minor proportions of other materials such as selenium, gallium, arsenic, antimony, cadmium, indium, bismuth and the like. In accordance with the example of FIG. 2 I produce a bulk concentrate of the ore at 41 and subject the ore to a low temperature controlled atmosphere roast as indicated at 42. The conditions of the roast are indicated generally at FIG. 1, with four to six parts of stack gas cleaned, cooled and delivered back to the ore delivery end of the roaster to one part of outside air, the exact amount of re-circulated and cooled stack gases being determined by the proportion of iron in the ore with about six parts of stack gases being re-circulated when the iron content of the ore is of the order of fifteen to twenty percent. The time of movement of a charge through the reaction zone is about one hour. Between seventy-five and ninety percent of the selenium present in the ore is recovered from the stack gases at 43. As recovered, the selenium exhibits a reddish color but boiling in clear water will convert it to the usual selenium grey. Its purity is very high, the total proportion of impurities being of the order of ten to fifty parts per million. The roasted ore is received from the reaction zone at 44 and is allowed to cool to room temperature before being brought into contact with the air. On examination it will be found that the complex is broken and the metal constituents present are all in the form of separate compounds, usually a mixture of iron oxide and sulfide of the non-ferrous metals, with apparently some traces of sulfate. The roasted ore is then brought to a leach station where it is leached with dilute sulfuric acid and a leach solution recovered at 47 containing ferrous sulfate with all of the arsenic in the ore in solution probably as an acid, with a substantially large proportion of the gallium and some of the antimony. The leach solution is then treated at 48 for the removal of gallium, arsenic and antimony, and the production of a substantially pure ferrous sulfate solution at 49. A suitable purification procedure is to treat the solution at 48 with stoichiometric proportions of finely divided iron powder to precipitate out arsenic and antimony, both as the metal. Gallium may be precipitated at this point as shown at station 51, or the gallium may go with the ferrous sulfate solution and subsequently be removed from such solution in accordance with several different available procedures.

At 52 the residue remaining after the acid leach to recover iron is subjected to a relatively high temperature oxidizing roast above 570° C. and suitably as high as 650° C. to 700° C. to solubilize remaining constituents by driving off remaining quantities of $SO_2$ and leaving the materials in the form of oxides or sulfates, depending upon the equilibria involved. When the high temperature roast is employed, the balance of the selenium in the ore will be found in the stack gases and can be recovered by suitable precipitating means as indicated at 53. After the high temperature roast, the residue is subjected to an acid leach at 54 to remove zinc, copper, cadmium, indium and the remaining gallium to leave a residue at 56 which contains all of the lead, the gold and silver and such bismuth and germanium as may be present. Antimony if present may be found either in the residue at 56 or in the sulfate solution as at 57, but commonly will be distributed between the residue and leaching solution. The leaching solution contains sulfates of zinc, copper and cadmium and indium if present in the ore. These values may be recovered in any suitable manner as indicated at 58 including any known chemical and hydrometallurgical method, or in accordance with any one of the procedure discussed in my issued patent or co-pending application. Illustrative of basic techniques are the precipitation of copper with metallic zinc to increase the zinc sulfate content of the solution and precipitate copper out as finely divided metal particles. Cadmium and indium may both be removed from the solution by adding additional amounts of finely divided metallic zinc, the cadmium and indium being precipitated as metals. In each instance there will be some metallic zinc mixed with the metallic cadmium and indium, and the mixture can be set aside for later treatment to produce an effective separation. It is possible to separately precipitate the cadmium, but sometimes there is nothing gained thereby. Zinc can be stripped from the zinc sulfate solution electrolytically or the zinc may be recovered by any one of several known chemical procedures.

The residue at 56 from the acid leach of the zinc, copper, cadmium, etc., from the high temperature oxidizing roast contains all of the lead, such gold and silver as may be present, and also such bismuth and germanium as may be present in recoverable condition. The lead is first removed by converting it to lead carbonate as indicated at 59, and then leached out with acetic acid to form a lead acetate solution as shown at 61. The lead acetate solution may be treated with sulfuric acid to precipitate the lead sulfate and the acetic acid solution regenerated for further leaching of lead carbonate. To form lead carbonate the residue is normally treated with a slurry of sodium carbonate, and the resulting sodium sulfate formed by conversion of the lead sulfate to lead carbonate is withdrawn as a sodium sulfate solution as indicated at 62. The residue as shown at 63 is now a highly concentrated solid mass, as contrasted with the original ore, so that even though the gold and silver and bismuth and germanium if present were only present in trace amounts in the original ore, they will be found in fairly concentrated amounts in the residue at 63. The residue is treated with a cyanide solution at 64 and gold and silver cyanide recovered at 66. The residue containing bismuth and germanium is delivered to 67 and leached with a twenty-five percent hot sulfuric acid solution at 68 to produce a solution at 69 comprising bismuth and germanium sulfate with an excess of sulfuric acid. This solution is then suitably treated to recover bismuth and germanium. The acid leach may leave some germanium in the ore which may be removed by a sodium hydroxide leach, or an alkali metal hydroxide with some excess of the hydroxide used directly to leach the germanium. The tailings at 71 comprise essentially only $SiO_2$ and the like gangue materials. By weight it will normally represent approximately 0.15% to 5% of the original heads, that is to say the starting bulk concentrate indicated at 41.

While the flow chart shown in FIG. 2 is fairly complete, those skilled in the art will understand that it is by no means exhaustive in its treatment of all of the various loops characteristic of complete processing. I have not shown, for example, the common practice of returning stripped solutions for further leaching, the building up of residues of trace elements and the recovery of the trace elements after they have built up to a reasonable value, and many other details which are characteristic of hydrometallurgical and chemical procedures and which, while somewhat different when practising the present invention, are sufficiently similar to known methods as to be without particular significance in the over-all patentable aspects disclosed.

*Example 2*

Proceeding generally in accordance with Example 1 and the flow sheet of FIG. 2, a bulk concentrate was made of an Arizona ore having the following assay:

| | |
|---|---|
| Gold, oz. | 0.375 |
| Silver, oz. | 11.11 |
| Iron, percent | 22.78 |
| Zinc, percent | 24.29 |
| Lead, percent | 10.6 |
| Copper, percent | 0.865 |
| Cadmium, percent | 0.09 |
| Antimony, percent | 0.87 |
| Arsenic, percent | 1.2 |
| Bismuth, percent | 0.006 |

The above bulk concentrate contained:

| | |
|---|---|
| Pounds of iron | 455 |
| Pounds of zinc | 485 |
| Pounds of lead | 212 |
| Pounds of copper | 17 |
| Pounds of cadmium | 1.8 |
| Pounds of antimony | 17 |
| Pounds of arsenic | 24 |
| Pounds of bismuth | 0.12 |

The listed materials totalled slightly over 72% of the original total of 2,000 pounds, and the balance comprised sulfur, silica, some alkali and alkaline earth metals, and some rare metals including gallium, indium, germanium and selenium. The assay given was a commercial assay and did not identify the presence of any rare metals, but in the final recovery I found substantial percentages of such rare metals.

The concentrate was then roasted without preliminary removal of the alkali and alkaline earth metals for two hours at a maximum temperature of 450° C. and with a furnace atmosphere characterized by the introduction of one part of air to six parts of cooled stack gases. The roasted concentrate was then reduced to 1,920 pounds and it assayed as follows:

| | |
|---|---|
| Gold, oz. | 0.446 |
| Silver, oz. | 13.6 |
| Iron, percent | 27.4 |
| Zinc, percent | 28.1 |
| Lead, percent | 12.9 |
| Copper, percent | 1.05 |
| Cadmium, percent | 0.11 |
| Antimony, percent | 1.02 |
| Arsenic, percent | 1.3 |
| Bismuth, percent | 0.007 |

The elements listed above comprise 85.9% of the total, the balance being represented by sulfur, some oxygen introduced during the roast and combined with iron, plus silica and such rare metals as were present.

The roasted product was then leached with dilute sulfuric acid and the solution from this leach was found to contain:

| | |
|---|---|
| Pounds of iron as the sulfate | 470 |
| Pounds of arsenic | 26 |
| Pounds of antimony | 2.9 |

The solution was agitated with elemental iron powder and the arsenic and antimony precipitated as metal.

After precipitation of the arsenic and antimony with iron the remaining solution was found to contain 506 pounds of iron and a small amount of calcium and magnesium as sulfates. This solution was then put through an evaporator and crystallizer and the end product of the operation consisted of 2450 pounds of hydrated ferrous sulfate ($FeSO_4 \cdot 7H_2O$).

In connection with the removal of iron, it may occur that some of the iron remains in the residue notwithstanding the fact that the process has been properly controlled to convert all of the iron to FeO. I have discovered that under certain conditions there will be a cocooning process in which some of the iron is cocooned in a shell of other metal. I find that by a simple grinding step during leaching practically one hundred percent of the iron may be removed, and this may be important depending upon specific control desired with respect to the residue after iron removal.

The washed and dried residue after the acid leach to remove the iron weighed 1060 pounds. It assayed as follows:

| | |
|---|---|
| Gold, oz. | 0.693 |
| Silver, oz. | 20.6 |
| Iron, percent | 0.4 |
| Zinc, percent | 46.0 |
| Lead, percent | 21.0 |
| Copper, percent | 1.6 |
| Cadmium, percent | 0.167 |
| Antimony, percent | 1.37 |
| Arsenic, percent | Nil |
| Bismuth, percent | 0.011 |

In the above assay the figures for gold and silver are given in terms of ounces per ton in accordance with usual practices, but if these are calculated in terms of approximately half a ton the figures would be .346 ounce per half ton of gold and 10.3 ounces per half ton of silver, which, of course, is generally in line with the original assay figures.

This residue was roasted at 635° C. for one and one half hours. In a modification of the process roasting was carried on for one hour at a temperature between 700° C. and 750° C. The results were about the same in each instance, and the further explanation which follows can assume that the roast occurred in connection with either set of conditions. The roasted product in each instance weighed 980 pounds. The assay was substantially the same as given immediately hereinabove, except that the percentages were somewhat higher because of the replacement of much of the sulfur driven off with oxygen. In this particular case practically all of the metals were in the form of the oxides with some slight amounts of sulfate. The conditions can be controlled so that the sulfates predominate or represent substantially the entire mass, and, of course, it is understood that in general the sulfates are as readily leached as the oxides.

The 980 pounds of roasted residue was then leached with dilute sulfuric acid ending with a pH between 2 and 3, or, in other words, with a very small amount of free sulfuric acid remaining after the leach. The leach solution contains substantially all of the zinc, cadmium and copper with a trace of iron. The amount of iron was so slight, particularly when the iron leach is conducted with some grinding to break up any cocooned particles, that it is very difficult to detect by any ordinary laboratory methods. An analysis of this leach solution shows it to contain 480 pounds of zinc, 17 pounds of copper and 1.8 pounds of cadmium. Under the conditions disclosed, the lead remains in the residue.

The leach solution was then treated with 25¼ pounds of zinc metal powder, all of which would pass a one hundred mesh screen, and the solution was then agitated. Using stoichiometric proportions of zinc powder, a precipitate of a pure, finely divided copper was obtained. In this particular case the copper weighed 17 pounds. The copper is separated and is found to be very pure and can be employed directly in producing many types of copper hardware or, of course, alloyed with zinc, tin or the like to produce brasses and bronzes of commerce.

After the removal of copper in the manner described, the solution was further treated by the addition of five pounds of zinc powder and agitated until the solution was substantially neutral, that is to say had a pH of about 7. Under these conditions the solution will contain some free zinc which, of course, will be precipitated in due course with the cadmium. The precipitate was found to contain sixty percent cadmium and forty percent zinc. In actual practice this precipitate is preferably put to one side until a substantial quantity is at hand, after which the zinc and cadmium can be separated in accordance with one of several procedures, none of which is particularly concerned with the present invention. Cadmium represents a metal in relatively short supply, and, although it is not technically classified as a rare metal, normally the cadmium content of complex ores is lost during the processing. While several different schemes may be followed to recover the cadmium, one simple method is to redissolve the mixture comprising sixty percent cadmium and forty percent zinc to produce a cadmium sulfate/zinc sulfate mixed solution. The cadmium may readily be stripped from this solution electrolytically.

After the removal of the copper and cadmium the leached solution was found to contain 508.5 pounds of zinc as the sulfate in substantially pure form. There are several chemical and/or hydrometallurgical methods for recovering zinc values from this solution none of which is particularly peculiar to my present invention.

The residue remaining after the acid leach for the removal of zinc, copper and other metals was then washed and leached with twenty percent sulfuric acid at approximately 200° F. for one hour, and the leach solution then separated from the solid residue. This leach solution contained 12.8 pounds of antimony as the sulfate. I referred previously to a grinding leach to remove iron and in this connection it may be noted that if such grinding leach is employed, not only will at least 99.99% of the iron be removed, but a substantial amount of the antimony and sometimes all of the antimony may be removed by this first leaching step. It is the antimony which is not removed during the first leaching step which is removed by the hot concentrated sulfuric acid leach referred to immediately hereinabove. By adding eight pounds of zinc metal powder to the antimony sulfate solution a precipitate is obtained comprising antimony metal. From a solution containing 12.8 pounds of antimony I readily removed 12.1 pounds of antimony metal by the precipitation procedure discussed, and this percentage can be further increased in actual practice and under suitable controls. The trace of antimony remaining in the solution is not lost because the solution after the antimony removal is re-circulated back in accordance with usual practice and can be employed for the zinc copper antimony leach.

The residue after the antimony leach contains all of the lead and substantially all of the gold and silver, with sometimes traces of rare metals such, for example, as germanium and bismuth if present in the initial ore. This residue was then mixed with a slurry containing one hundred and ten pounds of sodium carbonate and the mixture heated for half an hour at 200° F. This treatment converts the lead sulfate in the residue to lead carbonate and forms sodium sulfate which is withdrawn from the residue in the form of a solution, and the dry residue washed to remove all of the sodium sulfate. The residue is then leached with a ten to twenty percent solution of acetic acid for approximately one hour at ordinary room temperature to convert the lead carbonate into lead acetate. The resulting lead acetate solution is withdrawn and one hundred pounds of concentrated sulfuric acid added to it to precipitate insoluble lead sulfate. The washed and dried lead sulfate weighed three hundred and ten pounds and, of course, the regenerated acetic acid is returned to storage for further use in leaching lead carbonate.

The residue after the removal of the lead weighed forty-six pounds, and this residue was then leached with a sodium cyanide solution for two hours and the solids and the liquids separated and the solids washed. Zinc powder was added to the cyanide solution and gold and silver precipitated. There was a total of 0.379 ounce of gold and 12.3 ounces of silver. It will be noted that these figures are generally within the range of assay on the original heads, but actually slightly higher than the gold and silver content as indicated by the assay. I have found that with the practice of my invention this almost always happens, and it appears to indicate that in some manner or other traces of gold and silver are so locked up in the complex that they are not detected by ordinary assay methods.

After removal of the gold and silver the dried residue was found to weigh forty-five pounds. It assayed:

| | Percent |
|---|---|
| Silica | 74 |
| Iron | 15 |
| Antimony | 0.09 |
| Bismuth | 2.8 |
| Lead | Trace | and no zinc or copper. If desired, of course, the bismuth may be separated by suitable means from this residue.

*Example 3*

A bulk concentrate of a complex sulfide ore from Arizona assayed as follows:

| | |
|---|---|
| Au, oz. per ton | .4 |
| Ag, oz. | 17.7 |
| Zn, percent | 35.5 |
| Pb, percent | 14.4 |
| Fe, percent | 10.5 |
| Cu, percent | 0.94 |
| Sb, percent | 1.3 |
| Bi, | .09 |
| Cd, percent | 0.11 |
| As, percent | 1.7 |

A ton of this concentrate was treated in accordance with the process shown in FIG. 1, the time of treatment being one hour, the maximum temperature 470° C., and the feed back of cooled stack gases six times in volume that of the air introduced at the sides. After the first roast the product weighed 1822 pounds, and after the first leach the residue weighed 1484 pounds. The residue from the iron leach was dried and heated in an oxidizing atmosphere for one hour at a temperature of 700° C. After such roast the product weighed 1394 pounds. After the second roast the mixture was leached with sulfuric acid and after the leaching the residue weighed 460 pounds. The zinc so recovered as zinc oxide and weighed 824 pounds, the copper was recovered from the solution as metallic copper and weighed 18.66 pounds. 2.12 pounds of cadmium were recovered. The residue after the second leach was treated in accordance with the process described to remove lead, and 420 pounds of lead as lead sulfate were obtained. The residue after lead extraction weighed 40 pounds and contained the gold and silver in addition to the $SiO_2$ content of the heads. Arsenic, of course, was extracted with the iron and the bismuth was also in the final residue. In this particular operation no separate recovery of rare metals was made; in fact, this particular ore contained only traces of rare metals.

*Example 4*

Figure 3:
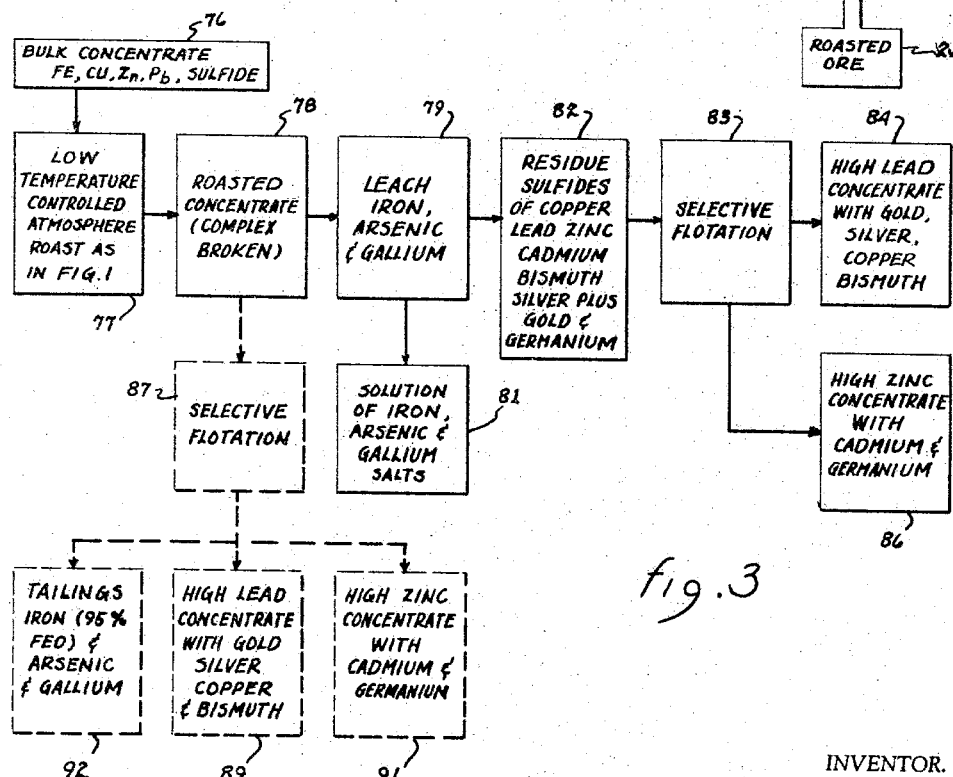
FIG. 3 is another illustrative flow sheet in which a bulk concentrate of a complex ore is first roasted in a controlled atmosphere, the iron removed therefrom, and the residue then subjected to flotation to produce high grade concentrates of lead and zinc.

A bulk concentrate was made of a complex Arizona ore taken from the Bradshaw area. A complete assay of the concentrate was not made, but it was determined that it contained:

About 1.12 oz. gold per ton
About 33.3 oz. silver per ton
About 30% lead
About 2½% copper
About 35% zinc
In excess of 20% iron Looking at FIG. 3, the bulk concentrate indicated at 76 was subjected to a controlled temperature roast as indicated at 77, the ratio of stack gases to air being five to one, the maximum temperature 500° C., and the total time of exposure of the concentrate to the heat and atmosphere of the reaction zone seventy minutes. The initially roasted ore after cooling was removed at 78 and it was found on inspection and testing that the complex iron-zinc-lead-copper complex had been broken, that the iron was substantially all in the form of FeO, and that the principal remaining metal values, particularly zinc, copper and lead, were apparently in the form of simple sulfides exemplified by the formulae ZnS, CuS and PbS. The roasted concentrate was then leached at 79 with a dilute sulfuric acid and a solution obtained at 81 comprising essentially ferrous sulfate with an admixture of arsenic and antimony and some slight amount of gallium, none of which had been noted in the initial partial assay of the ore. The residue at 82 was found to be substantially free of iron, contained no arsenic and only a trace of antimony. It also contained traces of cadmium, bismuth and germanium as well as gold and silver, as found in the original partial assay.

The solid residue after the iron extraction was then passed to a flotation station as indicated at 83, the solids dispersed in aqueous media in accordance with flotation practice, a relatively small proportion of creosote was added and the product rendered slightly alkaline by the addition of soda ash, and flotation carried out using a standard Denver equipment cell. A lead concentrate was produced as shown at 84, and this concentrate was found to contain 82% lead as the sulfide together with gold and silver, copper, and bismuth, of course, in small proportions. The residue after the lead flotation was a high grade zinc concentrate as shown at 86 containing 61% zinc with traces of cadmium and germanium.

In a modification I passed the roasted concentrate to a flotation station 87 (see the left hand side of FIG. 3 and the broken lines indicating modification) without preliminarily leaching the iron. I first produced a lead concentrate in the same manner as previously described using creosote as a flotation reagent and rendering the material slightly alkaline as previously described. By these means I produced a high grade lead concentrate at 89 containing 70% lead. The concentrate, of course, had the usual small proportions of silver, gold, copper and bismuth, as previously described.

The aqueous residue after the flotation of the zinc concentrate was then treated with sulfuric acid to render the product slightly acid and flotation was again carried out using pine oil as a flotation reagent. This flotation step left the iron behind and produced a high grade zinc concentrate as indicated at 91 containing 54% zinc. The tailings indicated at 92 contained substantially all of the iron as FeO together with arsenic and traces of antimony and gallium.

The results obtained in accordance with this Example 4 are particularly significant when compared with commerical operations representing techniques of the prior art as applied to this same ore. In the commercial operations there is no iron recovery such as I obtain, all of the iron which can be removed going to a tailings pile. The concentrate is subjected to several selective flotation steps employing expensive reagents, particularly collectors, to produce a commercial lead concentrate and a commercial zinc concentrate, both of which are sold as end products of the mining company to commercial smelters. The lead concentrate produced in accordance with these commercial practices will average about 30% lead, while I obtain an 82% lead concentrate in one case and a 70% concentrate in the other. In the case of the zinc concentrate, the commercial product will run about 50% zinc concentrate, while I obtain a 61% zinc concentrate in one case and a 54% zinc concentrate in the other case. The percentage of lead and zinc in the concentrates does not tell the whole story, however, because the lead concentrate will contain up to 20% iron whereas my lead concentrate is substantially free of iron, and the lead concentrate will also contain up to 10% to 12% zinc whereas my lead concentrate is substantially free of zinc. The commercial zinc concentrate is somewhat better in that the iron content is only about 8% or 9%, as contrasted with approximately zero with the concentrate of my invention, but it will contain about one-half percent of lead and some copper, while my concentrates are substantially free of these two metals. Still another important thing is that in the commercial operation discussed, the concentrates will only represent a part of the lead and zinc values in the ore, whereas in the case of my invention substantially 100% of the lead and zinc values in the ore will end up in the concentrate. One of the significant things about Example 4 is that it shows clearly that the complex is broken and a very clean separation between the various metals in the heads is obtained.

*Example 5*

In accordance with another example (looking at FIG. 4) I selected an iron-copper sulfide from the Bagdad area of Arizona comprising principally chalcopyrite with some slight admixture of products representing degradation of chalcopyrite. The concentrate contained about 22% iron, 26% copper, 0.5% molybdenum and traces of gold, silver, selenium, gallium and germanium. The ore was obtained as a concentrate and whether or not it was a complete bulk concentrate or whether or not it was mined to take the ore as it came, I do not know. In any event, the complex iron-copper sulfide comprising essentially chalcopyrite, as indicated at 92, was subjected to a low temperature roast in accordance with the FIG. 1 procedure as indicated at 93. The time of roasting was three-quarters of an hour, the maximum temperature 400° C., and the proportion of cooled stack gases to air about six to one. A substantial portion of the selenium was vaporized as indicated at 94 and recovered from the stack by a precipitation procedure. The roasted product was then subjected to a sulfuric acid leach as indicated at 96 to remove iron in the form of a solution as indicated at 97, and the residue washed at 98 and then passed into a higher temperature roasting zone at 99 where the remainder of the selenium was removed as shown at 101. The roasted product was then acid leached as at 102 and a copper sulfate solution recovered as at 103, the residue 104 containing the gangue and the gold and silver present. The copper solution may be suitably purified as at 106 and a de-polarizing agent added as required, after which it is delivered to an electrolytic cell 107 and the copper plated out of solution on suitable cathodes to produce electrolytic copper as indicated at 108. The impurities removed from the copper may be processed to recovery as indicated at 109, and the electrolyte solution after a suitable proportion of the copper has been stripped therefrom as shown at 111 is circulated back as indicated by the broken lines for further acid leaching at 102.

In a modification of the process as indicated by the broken lines at the left of FIG. 4, the product resulting from the first roasting step is delivered to a flotation station as indicated at 112, and a copper sulfide concentrate produced as indicated at 113. This concentrate may run as high as 80% copper and usually it will have some metallic copper associated with it. The tailings are an iron concentrate as indicated at 114 containing substantially all of the iron in the heads and being as high as 95% in iron as FeO making it an excellent furnace feed in conventional steel making operations. The iron oxide (FeO) of this concentrate may be treated in any one of many additional methods as already described hereinabove, but in any case it is a highly valuable commercial product. The copper sulfide may be treated in accordance with many different procedures such, for example, as delivery to a copper smelter for improving the character of the matte normally fed to the converters.

This Example 5 as illustrated in FIG. 4 may be compared with practices of the prior art. While it is known that copper can be extracted from simple complex sulfides such as chalcopyrite, the ore or concentrate must first be subjected to a high temperature roast and recoveries may only be of the order of sixty percent of the copper present. When it is considered that the ordinary iron-copper sulfide ore will run beween about a half percent and one percent copper, or in very good deposits up to about two percent copper, it is obvious that a substantial loss in the copper recovered cannot be tolerated. There is one thing to be said for pyrometallurgical methods as applied to copper, and that is that they recover a very substantial amount of the copper present in the concentrate, usually in excess of 99.9% of such copper. This, however, is done at the expense of recoveries of rare metals since, especially in the case of copper smelting, the very high temperatures employed in the converter will cause substantial losses. One reason for the smelting treatment is that at the very high temperatures involved the metal complex is broken, but the iron is still a wasted product, notwithstanding the fact that many attempts have been made to find ways of recovering it.

In almost all instances pyrometallurgical recovery of copper is followed by electrolytic deposition, the principal reasons being that only in electrolytic cells are the gold and silver recovered, but also some other impurities in the final tough pitch copper produced at the smelter can be removed by the electrolytic operation, and the "pitch" of the copper is readily controlled to fit it for various types of fabrication. It is a long and expensive process to first produce the concentrate, then run the concentrate through a reverberatory furnace to produce the matte, deliver the copper to the converter to produce blister copper, convey the blister copper to the finishing furnace for further purification and poling to remove the oxygen, casting the copper from the finishing furnace into anodes, and then shipping the anodes to an electrolytic plant for the production of electrolytic copper.

This operation may be compared with that of my present invention wherein a copper sulfate solution is produced directly from the concentrate and substantially one hundred percent of the copper recovered. This copper solution after purification is then fed directly to an electrolytic cell without the need to interpose any of the expensive pyrometallurgical equipment now commonly employed.

Looking at the left hand side of FIG. 4 I produce a very high grade copper sulfide concentrate, which makes an excellent feed for a smelter, and at the same time recover substantially all of the iron present in the ore in the form of salable end products.

*Example 6*

FIG. 5 may be consulted in connection with this Example 6. Starting with the iron-copper sulfide employed in the previous example as indicated at 116, the concentrate was subjected to a low temperature roast at 117 in accordance with FIG. 1 using time, temperature and atmosphere conditions as described in connection with the previous example. For convenience I have disregarded the presence of everything except the major constituents, except for gold and silver which in any case are found in the final residue. The roasted concentrate was leached at 118 to remove iron in the form of a ferrous sulfate solution 119. The residue 121 contained the copper, and this was subjected to an oxidizing roast at a temperature of 550° C. for one and one-quarter hours as indicated at 122. The resulting material was leached as at 123 to remove copper in the form of a sulfate and produce a copper solution as indicated at 124. The residue after the copper removal at 128 contained gold and silver and represented from a percentage weight standpoint only a very small portion of the original heads. The ferrous sulfate solution 119 was treated to recover dry ferrous sulfate 121 which was treated in accordance with methods previously discussed to produce finely divided metallic iron at 122. Some of this finely divided metallic iron was added to the copper solution at 124 and copper as the metal precipitated at 128. This represents substantially one hundred percent of the copper in the heads. The copper, moreover, is highly pure and can be used directly without further purification except, of course, such compaction as may be indicated. The metallic iron added to the copper sulfate solution is converted to ferrous sulfate and this ferrous sulfate is withdrawn as a solution as indicated at 127. This solution, of course, is circulated back for further treatment in accordance with whatever procedure has been established. In the flow sheet all of the ferrous sulfate is indicated as being converted to Fe, but it should be borne in mind that only a relatively small percentage may be so converted to produce a reagent for copper precipitation for step 124. It appears unnecessary to explain further in connection with this example the various ways in which the ferrous sulfate may be treated nor the manner of recovering the gold and silver and such other values as may be present in the residue of 126.

The process of the present example as indicated at FIG. 5 may be compared with existing smelting procedures from both a recovery, cost and capital equipment standpoint. In the case of FIG. 5 the copper metal may be produced right at the mill without the use of costly capital equipment such as those characteristic of smelting operations and electrolytic cells which, of course, are not only expensive, but must be located near available inexpensive power. While certain of the features associated with this example are old, the procedure represents an over-all self-contained process in which the significant step is the controlled atmosphere roast, without which it would be impossible satisfactorily to accomplish the remaining steps of the process.

*Example 7*

I have already explained that I may conduct the relatively low temperature controlled atmosphere roast as illustrated in FIG. 1 in such a manner as to solubilize more than one metal of a complex ore, while at the same time breaking the complex, causing the sulfides to be re-arranged as simple sulfides such as ZnS, PbS, etc. FIG. 6 illustrates a method utilizing this characteristic for the recovery of copper from an ore comprising essential iron-copper sulfide. The concentrate employed in this example ran around 20% iron and about 25% copper. It had traces of other elements, but for convenience I have deleted reference to other elements from this example, the manner of recovering such materials as cadmium, bismuth, and rare metals such as selenium, gold and silver having already been explained.

The concentrate indicated at 131 was passed continuously through a reaction zone in equipment of the type shown in FIG. 1. The furnace atmosphere was controlled by delivering thereto approximately one part of air to three parts of cooled stack gases. The time required to pass the concentrate through the reaction zone was set for about fifty-five minutes and the maximum temperature adjusted to about 600° C. The roasted product contained some $Fe_2O_3$ and some metallic copper, but all of the iron and copper were soluble in dilute sulfuric acid and were treated with such acid as indicated at 133. The residue at 134 contained principally the gangue constituents from the original heads. An iron-copper sulfate solution was thus produced as indicated at 136. In keeping with the initial guide lines I will not discuss the impurities in this solution, but it is obvious that in the normal ore there will be some trace materials which will find their way into this solution and usually will have to be removed by standard chemical means, although there are some impurities which can be delivered to an electrolytic cell without raising a problem of any kind. Depending upon the amount of iron present, this solution may be fed directly to an electrolytic cell, but preferably I remove some of the iron as ferrous sulfate, suitably by a crystallizing and precipitation process as indicated at 137. The solution is then delivered to an electrolytic cell 138 with at least some of the original iron present as ferrous sulfate. This acts as a de-polarizing agent in accordance with known technology, and metallic copper is plated out on cathodes as indicated at 139. The reclaimed solvent is returned for further use as a leach as indicated by the broken lines.

Instead of depending entirely on control of the low temperature controlled atmosphere roast to solubilize all of the copper, I may solubilize only the iron or only a part of the copper and then entrain air by suitable means, such as bubbling the same beneath the surface of the solution to introduce air with the leach solution and convert some of the ferrous iron to ferric iron. The ferric iron acts as a solvent for copper sulfide and such traces of copper metal as may be present. Copper sulfate is thus directly leached by the acid and goes into solution with the ferrous sulfate. It should be pointed out in this connection, however, that if there is zinc or lead in the solution, this method involving the introduction of air should not be employed because it would have the effect of also solubilizing the lead and zinc sulfide and dissolving both of these materials into the solution as lead sulfate. When producing an iron-copper sulfate solution in accordance with this example I find it convenient sometimes to partially solubilize the copper during the low temperature controlled atmosphere roast and continue the solubilization by the technique involving oxidation of the ferrous sulfate, I have found that all iron-copper sulfide ores do not behave in exactly the same way. In some instances care must be taken to solubilize only the iron, or otherwise some copper will dissolve with it, and in other cases only the solubilization of the iron appears to occur readily, and very careful control is necessary to solubilize the copper as well. Generally speaking, however, despite peculiarities of the ore, it is quite possible on a commercial basis to produce a solution from chalcopyrite comprising only iron sulfate or comprising both iron sulfate and copper sulfate.

*Example 8*

A concentrate of iron-copper sulfide ore comprising essentially chalcopyrite was provided at 146 as shown in FIG. 7. This ore was similar to that described in connection with FIG. 4, but it contained 23% iron, 27% copper and traces of gold, silver, selenium, gallium, germanium, antimony, arsenic and moybdenum. While the ore was essentially a sulfide ore, there was a very slight inclusion of oxide and carbonate minerals apparently formed by partial weathering of the chalcopyrite. The ore was subjected to a low temperature controlled atmosphere roast as indicated at 147, and part of the selenium was recovered from the stack gases shown at 148. The percentage of cooled stack gases to air was about four hundred percent, the time of passage through the reaction zone was about one hour, and the maximum temperature was approximately 600° C. The resulting product contained relatively small proportions of $Fe_2O_3$, but most of the iron was in the form of the ferrous oxide FeO. A very small percentage of the copper was in the form of metallic copper, but the balance comprised mostly CuO and Cu₂SO₄. Most of the iron and copper were freely soluble in sulfuric acid. The roasted product was leached with sulfuric acid as shown at 149, and for assurance of complete solubility, air was bubbled through the solution throughout the leaching step and a solution was obtained as shown at 151 containing all of the copper as the sulfate, substantially all of the iron, plus the gallium and arsenic. The arsenic was first precipitated from the solution with magnesium, and metallic iron then added to the solution at 152 to precipitate substantially one hundred percent of the copper. This copper after washing was found to be a highly pure metallic copper suitable for commercial use as recovered. The ferrous sulfate solution as indicated at 154 contained substantially all of the iron in the heads plus the iron introduced to precipitate the copper, all this iron being present is the ferrous sulfate.

For all practical purposes the steps of the method heretofore described comprise a complete process in that all of the copper has been recovered as the metal and all of the iron has been recovered as a ferrous sulfate solution which can merely be dried to produce a salable agricultural grade ferrous sulfate having a ready sale. This part of the process can be compared to smelting procedures in which substantially only the copper is recovered and the iron discarded as a slag. The very definite advantage in the procedure disclosed, however, is that practically one hundred percent of the copper is recovered in accordance with very simple, inexpensive procedure requiring no highly expensive capital equipment and the iron normally a waste product is recoverable as a valuable by-product.

My invention provides for still additional recoveries, however, which are not characteristic of copper ore processing except, of course, for the recovery of some of the gold and silver commonly picked up in the "mud" at the bottom of the electrolytic cell. Looking at station 156, the residue from the iron and copper sulfate leach contains the gold and silver and traces of germanium and molybdenum. The residue may be treated with a cyanide as shown at 157, gold and silver recovered at 158, and a residue free of gold and silver obtained as indicated at 159. This residue is then silver treated with a hot concentrated sulfuric acid solution and germanium and molybdenum recovered at 161, germanium as the sulfate and molybdenum as molybdic acid. As previously described, an alkali metal hydroxide leach may also be employed at this point. The residue at 162 comprises essentially only SiO₂ and such other gangue constituents as may be present.

The impurities in the ferrous sulfate solution both as it appears at 151 and 154 may be recovered in various ways. The ferrous sulfate solution stripped of all of its copper as at 154 may be delivered to an impurity recovery station such as at 163. By several different means the initial each solution as at 151 can, if desired, be treated to remove some of the impurities and, if this should be the case, such impurities may also be delivered to station 163. The solution then at 163 will comprise the ferrous sulfate solution from station 154 from which all of the copper has been stripped, and the impurities will comprise essentially gallium. The gallium may be removed by several different procedures. A very satisfactory method is to crystallize substantial portions of ferrous oxide from solution to produce a solution richer in gallium. This solution is re-circulated to build up the gallium to a relatively high figure, and the gallium then precipitated with ammonium acetate. A basic gallium acetate is precipitated (with some iron), the product further purified, and the basic gallium acetate heated to produce gallium oxide which may then be treated by known means to produce a final product. The solution with some or all of the impurities removed at 164 is shown as being delivered to an iron recovery station 166 where iron may be recovered in accordance with any suitable, desirable, salable form such as discussed hereinabove.

Preferably at least some elemental iron in the form of very finely divided particles is produced for use in the copper precipitation step. Station 165 is indicated as the point of gallium removal, and the two-faced arrow between 165 and 166 indicates balanced iron and gallium removal as explained.

In FIG. 7, for easy comparison with copper recovery procedures of the prior art, I have shown in full lines the steps employed in the recovery of the copper which, as pointed out, is substantially the only product of any consequence recovered by conventional smelting methods. All of the stations shown in broken lines represent additional recoveries from a common type of iron-copper sulfide, all of which are new with the present invention and represent recoveries not normally possible and, in many instances, completely impossible with conventional smelting methods.

*Example 9*

A bulk concentrate 171 (FIG. 8) of a complex sulfide ore comprising essentially an iron-lead-copper-zinc sulfide was prepared and subjected to a low temperature controlled atmosphere roast at 172 following the conditions shown in FIG. 1. The maximum temperature in the reaction zone was 400° C., the time of heating in the reaction zone was one and one-half hours, and the proportion of cooled stack gases to air was six to one. This ore also had some gold and silver. It had a content of some other metals as well, but for convenience reference thereto has been eliminated in this example as it is shown in FIG. 8. This low temperature roasting step solubilized the iron and the roasted ore was leached at 173 to form a ferrous sulfate solution at 174 from which the iron was recovered at 176.

The residue from the acid leaching to remove iron was again treated at a relatively low temperature in the general manner shown in FIG. 1 and as illustrated at 177 in the drawing. Conditions were maintained approximately as in the first step at 172, but the furnace temperature was controlled so that the maximum temperature immediately before discharge was about 550° C. The residue so heated was then treated with concentrated sodium carbonate solution at 178 to cause a double decomposition reaction involving the lead sulfate and the sodium carbonate, a sodium sulfate solution being withdrawn as at 179 and the residue passed to station 181 where it was washed and then leached with acetic acid to form a lead acetate solution 182. Lead was suitably recovered from this solution at 183, in this case by adding sulfuric acid to precipitate lead sulfate and regenerate the acetic acid which was then available for further leaching of additional residue containing lead carbonate. It is, of course, obvious that many different ways of recovering the lead from the lead acetate are available and the lead may be treated to meet any commercial demand such, for example, as lead oxide.

The residue from the acetic acid leach at 181 was then washed and dried and again roasted as at 184 in a controlled furnace atmosphere using equipment as shown at FIG. 1, and the same general conditions as employed in the first two steps indicated at 172 and 177, except that the maximum temperature was raised to about 600° C. The so-roasted ore after cooling was leached with dilute sulfuric acid as shown at 186 to produce a copper sulfate solution as shown at 187. The copper solution was delivered to a copper recovery area 188 where some of it was treated in an electrolytic cell as shown at 189 to produce electrolytic copper, and some delivered to a tank at 191 where zinc was added to precipitate copper as the metal and form a solution of zinc sulfate.

The residue at 192 was washed and dried and then subjected to a controlled atmosphere roast at 193 using the same general conditions as described for the previous roasts, and the same kind of equipment but with the maximum temperature controlled to about 650° C. This roast was then leached with sulfuric acid at 194 to produce a zinc sulfate solution 196, delivered to a zinc recovery station 197 where the zinc was recovered in accordance with several different procedures.

In addition to the metallic zinc which is readily prepared from this solution there are several zinc compounds having ready commercial sale, such as zinc sulfate itself and zinc oxide. Zinc oxide is not only used in medicine, but in many areas it has extensive use as a white pigment.

The residue from the acid leach to remove zinc is shown at 198. It may be treated with a cyanide solution as shown at 199 to produce a gold and silver cyanide solution at 201 which is then readily treated in accordance with known methods to recover gold and silver at 202. The residue at 203 represents only a very small percentage of the original heads and comprises substantially only gangue material, except in such instances where there are traces of rare metals such as germanium to be found in it.

*Example 10*

A complex ore comprising essentially iron-zinc-lead sulfide with a relatively small proportion of copper, about 0.7 ounce of gold per ton of concentrate, and about 24 ounces of silver per ton of concentrate was treated by means of a conventional high temperature roast. The metals were then taken into solution and only 60% of the zinc was recovered and 58% of the lead. The solution also contained only a trace of copper. The residue after acid leach was treated with a cyanide solution for ten hours, but only approximately 40% of the gold and silver was recovered.

This same ore treated in accordance with my invention and specifically in accordance with the general flow sheet shown in FIG. 2 accomplished substantially complete recovery of the zinc, lead and copper, and slightly more gold and silver than the assay showed to be present.

*Example 11*

A commercial lead concentrate was selected which assayed:

23% iron
32.9% lead
1.9% copper
9.4% zinc
0.71 oz. gold per ton
34 oz. silver

It was also found that it contained 1.6% arsenic. This lead concentrate which represented a final product of the prior art was then heated at 450° C. in a controlled atmosphere in the manner shown in FIG. 1, the proportion of cooled stack gases to air delivered to the furnace being about five to one. After roasting the iron was extracted with dilute sulfuric acid, the material being subjected to a simple grinding operation during the leaching procedure. Substantially all of the iron was removed. The residue after removal of iron was then subjected to froth flotation using wood creosote as a reagent in a slightly alkaline circuit. A lead concentrate was obtained containing 82% lead, and the residue after the lead removal was a good zinc concentrate with a total percentage of 63% zinc. When it is considered that zinc is not desired in a lead concentrate and its presence results in a penalty which reduced the price for the lead concentrate, it is obvious that the process of the present invention may be employed for direct improvement of a concentrate made in accordance with prior art procedures.

*Example 12*

A concentrate of a chalcopyrite ore from the Bagdad district of Arizona contained:

| | Percent |
|---|---|
| Iron | 29 |
| Copper | 24 |
| Sulfur | 30 |
| Molybdenum | 0.8 |
| $SiO_2$ | 10 | and a balance of calcium carbonate with traces of other impurities. This concentrate was roasted in accordance with FIG. 1 at a maximum temperature of 450° C. for one hour using six parts of cooled stack gases to one of air. The iron alone was extracted with sulfuric acid. The ferrous sulfate solution contained practically all of the iron, and the molybdenum was also removed with the iron. The residue was a much more highly concentrated copper concentrate than can be made by known procedures of the prior art. Such residue was then roasted in an oxidizing atmosphere at 700° C. and the copper leached with sulfuric acid, yielding a very pure copper sulfate solution. The copper was precipitated as metallic copper with finely divided metallic iron.

*Example 13*

Using the same concentrate as in the preceding example, the roasting time was increased to one and one-half hours, the temperature increased to 500° C. and the proportion of stack gases to air cut in half. On leaching with sulfuric acid substantially all of the iron and copper were taken into solution in the form of sulfates. This solution was treated in two ways, in one of which the copper was precipitated out of solution as metallic copper by means of metallic iron, and in the other of which the solution was delivered directly to an electrolytic cell and a substantial proportion of the copper stripped from the solution and plated on a cathode, the ferrous sulfate acting as a depolarizing agent.

For those skilled in the art to have a full understanding of the importance and scope of the present invention, further consideration should be given to the rare metal content of complex ores and the recovery thereof.

Modern technology continues to develop new uses for rare metals such as gallium, indium, rubidium, germanium, selenium, tellurium, thallium and the like. To a considerable extent commercialization is frequently delayed or even prevented by shortage of supplies. At the same time many complex ores containing such metals are processed without recovering such metals, and many ores containing substantial amounts of such metals are not even capable of economic beneficiation. Even such borderline metals as antimony, bismuth and cadmium are frequently in short supply, while fairly substantial proportions of such metals will be found in tailings and on slag dumps.

My present invention makes possible substantially complete recovery, frequently on almost a by-product cost basis, of all rare metals of any kind found in the ore. It is frequently surprising how many different rare metals will be found in a single ore, with no single one of such rare metals included in standard assays.

As a very cogent example, I wish to refer to the ore described in Example 2. From one ton of concentrate assaying as shown on the top of page 30, the amount of rare and borderline metals recovered was as follows:

| | |
|---|---|
| Gallium | 6 pounds (as oxide). |
| Indium | 3.5 pounds (as oxide). |
| Germanium | 846 grams (as oxide). |
| Selenium | 2 pounds (as metal). |
| Bismuth | 1.2 pounds (as metal). |
| Cadmium | 1.8 pounds (as metal). |
| Antimony | 17 pounds (as metal). |

The above figures are based on actual recovery analyses and recorded weights. I have reason to believe, particularly in the case of indium, that ultimate recoveries will be considerably higher than shown. From other ores I have recovered still other rare metals in substantial amounts, and there appears to be no limits on possible recoveries, other than the content of the ores themselves. I have been unable to determine the exact nature of the mineral containing the rare metal, but they appear obviously, in at least many instances, to be so bound chemically and/or physically that recoveries have been for the most part impossible by previous methods. Nor am I aware of the exact effect of the processing by my present invention on such rare metals. Whatever the mechanism, they are released so that they become freely available at the step of the process. I have shown, or explained, that the base metals after the first roast will be FeO and sulfides of the other base metals. I am not aware at present time exactly what occurs in the case of the rare metals, but a very large number of experiments shows that they are always substantially one hundred percent recoverable. There is a significant point as to recovery of germanium, for example. Assuming that there is 0.005% germanium in the original ore, in the final residue from which germanium may be extracted, there has been a concentration of at least forty times, and the germanium concentration will then be over 0.2%. It is then freely leachable, for example, with sodium hydroxide solution and may then be freely removed from solution by hydrolysis.

At least a substantial part of the indium is found in the zinc sulfate solution. If there were any iron in this zinc solution, there would be a co-precipitation of iron and indium and recovery would be very different. With no iron present, as in the zinc sulfate solution of the present invention, the indium can be recovered as a pure product. In the zinc sulfate solution, there is normally a fair amount of both indium and cadmium. By adding zinc metal, indium and cadmium will precipitate together as metals. They are then again dissolved in dilute sulfuric acid and the solution neutralized till it shows just alkaline to methyl red. After standing for several hours, or by warming, indium separates out as the hydroxide and this can be reduced to the metal by $H_2$ at about ° C.

What is said of indium is true in part of gallium. It will normally be found also in the zinc sulfate solution, but is not precipitated with indium and cadmium. To remove gallium the solution is heated after removal of indium and cadmium, and then made slightly alkaline by addition of zinc oxide. The solution is then cooled and gallium precipitates out as zinc gallate ($ZnGa_2O_4$). Gallium may be precipitated as the sulfide ($Ga_2S_3$) by dissolving the zinc gallate in sulfuric acid leaving about two percent free sulfuric acid, and the gallium sulfide may be calcined or treated in several different ways to produce metal or other desired compounds.

Previously I noted that in practically all cases I obtained greater recoveries of precious metals, particularly silver, than shown by assay of the head material to be present. This may be contrasted with other processes which almost invariably recoveries will be less than shown by assay to be present. In some cases this difference is marked and there are instances, particularly in case of silver, where recovery of precious metals shown to be present is for all practical purposes impossible.

There appears to be at least two reasons for explaining the above observed facts. Apparently, and this is one accepted theory, silver particularly will be locked in a compound of the type called "sulfo" minerals to distinguish from usual sulfides. They are characterized by the formula $X \cdot Y \cdot Z \cdot S_x$, in which X, Y and Z are cations, one of which is silver, S is sulfur and $x$ is a variable. Precious metals are present in very small percentage, and the combination of complex chemical and low concentration tends to make assays low and recovery still lower. My process breaks the complex and passes on all of the precious metals (without overheating) to a final concentrated residue in which the percentage of precious metals is increased at least forty-fold.

As an example, there is a property in northern Arizona which had been worked to recover the oxide ore for gold and silver recovery, and the sulfide portion thrown on a dump because of inability to extract gold and silver on a commercial basis. I made a simple bulk concentrate of this dump material, the concentration being about five to one. This assayed about 15% iron, 33% zinc, 13% copper and 2% lead, and sixty dollars per ton of gold and silver. By my process the base metals were readily recovered, and I also was able to recover all of the gold and silver present.

In the practice of my invention, due recognition may be given to practices in the industry. As an example, the United States Mint frequently prefers to recover gold and silver in the form of high concentrates, rather than in the form of bullion or ingots, which must be re-processed anyway. In detailing the steps of my process, I refer to removal of gold and silver by cyaniding or other treatment of the final residue. It must be remembered, however, that the concentration is such that such residue may be shipped direct to the mint and full value received for its gold and silver content.

Early in the specification I referred to the iron after the first roasting step as being acid-soluble. In most of the examples, however, I have referred to a sulfuric acid leach because use of sulfuric acid is common in leaching procedures and, moreover, my process provides a ready source of sulfuric acid. It should be remembered, however, that the iron is leachable by means of most inorganic acids and a relatively very large number of organic acids, including most of the common ones. Also, in various steps of the process the examples are illustrative and not limiting. Illustratively, where reference is made to the use of sodium carbonate to produce lead carbonate, other comparable carbonates, such as potassium carbonate, may of course be used.

Those skilled in the art will understand that because of the breaking of the sulfide complex in the first controlled atmosphere relatively low temperature roast, and because of the relatively large number of deposits of complex ores, no two of which as a rule are absolutely alike, there are large numbers of flow sheets which may be engineered to process such ores without departing from the scope of my invention. Illustratively, according to some specific examples, I produced concentrates of iron, lead and zinc, each with certain inclusions, and all produced by means of the simplest kinds of flotation techniques. It should be borne in mind that by means of the most advanced and latest techniques involving new frothers and sensitive selective collectors, I may produce still higher grade concentrates than some of those indicated—even concentrates comprising essentially only the metal desired in the form of its sulfide or other compound. It must be remembered that by means of my process the sulfide complex, which heretofore has prevented complete separation of metal values, is broken, and I may effect then almost perfect separations in many instances.

Illustration of a marked departure from the illustrative flow sheets shown in the drawings and the examples given in the specification may be found in the recovery of precious or rare metals. In the examples given the prime purpose is the recovery of base metals such as iron, copper, zinc and lead. There may be many instances, however, such, for example, as the low content of base metal or location of the ore, where processing and recoveries are directed principally or even only to precious and/or rare metals. In such a case the novelty of the present invention would be directed primarily to such purpose and the flow sheet modified accordingly. Many changes may be made if precious metal and rare metal recovery are not approached on a by-product basis. Thus, by controlling the iron leach with dilute sulfuric acid after the controlled atmosphere roast to a pH of between 1 and 2 at the end of the leach, I may remove a great deal of the gallium and indium as sulfates. Indium can be precipitated from solution with finely divided iron, and gallium as a basic acetate or ammonium compound. It may also be precipitated as the sulfide with hydrogen sulfide ($H_2S$). Germanium, which normally is found in the residue after the final leach, may be taken into solution at an earlier point in the cycle and also precipitated as the sulfide.

Terms in the specification and in the claims are, in general, used in their usual sense in the art unless the context indicates to the contrary. Thus, when I refer to iron and other "base" metals in the ore, I do not imply the presence of a chemical base such as sodium hydroxide, but a common metal as distinguished from a rare metal. When I refer to processing an ore, I include not only the ore itself but any fraction or concentrate thereof, even though I prefer to produce a bulk concentrate of the ore as the initial step in the practice of my invention.

Finally, although I have explained and illustrated my invention in detail so that those skilled in the art will understand the manner of practising the same, the scope of the invention is defined by the claims.

I claim:

1. A process of treating a complex sulphide ore containing iron to obtain the metal values therein which comprises:
   (a) heating said ore at a temperature between 400 and 600° C.,
   (b) in an atmosphere comprising a minor portion of air and a major portion of sulphur dioxide,
   (c) until substantially all of the iron present is in the form of ferrous oxide,
   (d) and cooling the roasted product out of contact with air to a temperature below 300° C.

2. A process of treating a complex sulphide ore containing iron to obtain the metal values therein which comprises:
   (a) heating said ore at a temperature between 400 and 600° C.,
   (b) in an atmosphere comprising a minor portion of air and a major portion of cooled stack gases, consisting essentially of a mixture of sulphur dioxide and nitrogen,
   (c) until substantially all of the iron present is in the form of ferrous oxide,
   (d) and cooling the roasted product out of contact with air to a temperature below 300° C.

3. A process of treating a complex sulphide ore containing iron to obtain the metal values therein which comprises:
   (a) heating said ore at a temperature between 400 and 600° C.,
   (b) in an atmosphere comprising a minor portion of air and a major portion of sulphur dioxide,
   (c) until substantially all of the iron present is in the form of ferrous oxide,
   (d) cooling the roasted product out of contact with air to a temperature below 300° C. and,
   (e) acid leaching the resulting roasted product to recover substantially all of the iron.

4. A process of treating a complex sulphide ore containing iron to obtain the metal values therein which comprises:
   (a) heating said ore at a temperature between 400 and 600° C.,
   (b) in an atmosphere comprising a minor portion of air and a major portion of sulphur dioxide,
   (c) until substantially all of the iron present is in the form of ferrous oxide,
   (d) cooling the roasted product out of contact with air to a temperature below 300° C. and,
   (e) subjecting the resulting roasted product to flotation to separate the sulphides from the iron oxide.

5. The process of claim 4 wherein the leached ore is roasted a second time at a temperature of above 600° C. in an oxidizing atmosphere.

6. A process of treating a complex sulphide ore containing iron which comprises:
   (a) continuously passing said ore through a sealed heated reaction zone,
   (b) continuously discharging roasted ore at a discharge end of said reaction zone,
   (c) passing a relatively small proportion of air into the reaction zone to partially oxidize the ore as it moves through the reaction zone,
   (d) continuously removing hot reaction chamber gases from the reaction zone at the ore receiving end thereof,
   (e) delivering a major amount of sulphur dioxide and nitrogen to the reaction zone at said ore discharge end, whereby to dilute said air and produce a furnace atmosphere high in sulphur dioxide, and
   (f) controlling the temperature of the ore to cause a gradual rise thereof to a minimum temperature of about 400° C. and a maximum temperature of 600° C.,
   (g) controlling the rate of movement through the reaction zone to convert at least substantially all of the iron present to ferrous oxide and,
   (h) cooling the roasted product out of contact with air to a temperature below 300° C.,
   (i) and acid leaching the resulting roasted product to recover substantially all of the iron.

7. A process of treating a complex sulphide ore of a class including iron, lead, copper and zinc which comprises:
   (a) heating said ore at a temperature between 400 and 600° C.,
   (b) in an atmosphere comprising a minor portion of air and a major portion of sulphur dioxide,
   (c) until substantially all of the iron present is in the form of ferrous oxide,
   (d) and cooling the roasted product out of contact with air to a temperature below 300° C.

8. A process of treating a complex sulphide ore containing iron, copper, lead and zinc to obtain the metal values therein which comprises:
   (a) heating said ore at a temperature between 400 and 600° C.,
   (b) in an atmosphere comprising a minor portion of air and a major portion of sulphur dioxide,
   (c) until substantially all of the iron present is converted to ferrous oxide while substantially all of the other metal values in the ore remain as sulphides,
   (d) and cooling the roasted product out of contact with air to a temperature below 300° C.

References Cited by the Examiner

UNITED STATES PATENTS

| | | | |
|---|---|---|---|
| 949,002 | 2/1910 | Ramage | 75—2 |
| 1,360,666 | 11/1920 | Mills | 75—109 |
| 1,634,497 | 7/1927 | Greenwalt | 75—21 |
| 1,992,049 | 2/1935 | Young | 75—21 |
| 2,065,547 | 12/1936 | Arnold | 75—6 |
| 2,878,102 | 3/1959 | Sternfels | 75—2 |
| 2,927,017 | 3/1960 | Marvin | 75—105 |

FOREIGN PATENTS

| | | |
|---|---|---|
| 500,063 | 2/1954 | Canada. |
| 359,478 | 10/1931 | Great Britain. |
| 394,650 | 6/1933 | Great Britain. |

BENJAMIN HENKIN, *Primary Examiner.*